US011277244B2

(12) United States Patent
Gao et al.

(10) Patent No.: US 11,277,244 B2
(45) Date of Patent: Mar. 15, 2022

(54) SIGNALING SENDING METHOD AND DEVICE, AND SIGNALING RECEIVING METHOD AND DEVICE

(71) Applicant: ZTE Corporation, Guangdong (CN)

(72) Inventors: Bo Gao, Guangdong (CN); Yu Ngok Li, Guangdong (CN); Zhaohua Lu, Guangdong (CN); Yifei Yuan, Guangdong (CN); Xinhui Wang, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/505,704

(22) Filed: Jul. 8, 2019

(65) Prior Publication Data

US 2020/0014514 A1    Jan. 9, 2020

Related U.S. Application Data

(63) Continuation of application No. PCT/CN2017/120347, filed on Dec. 29, 2017.

(30) Foreign Application Priority Data

Jan. 9, 2017    (CN) .......................... 201710014261.2

(51) Int. Cl.
*H04L 5/00*    (2006.01)
*H04W 72/04*    (2009.01)
*H04W 72/08*    (2009.01)

(52) U.S. Cl.
CPC ......... *H04L 5/0051* (2013.01); *H04W 72/042* (2013.01); *H04W 72/082* (2013.01)

(58) Field of Classification Search
CPC .. H04L 5/0051; H04W 72/042; H04W 72/082
See application file for complete search history.

(56) References Cited

U.S. PATENT DOCUMENTS

| 8,867,380 B2 | 10/2014 | Gorokhov et al. |
| 10,236,951 B2 | 3/2019 | Park et al. |

(Continued)

FOREIGN PATENT DOCUMENTS

| CN | 102356562 A | 2/2012 |
| CN | 104811231 A | 7/2015 |

(Continued)

OTHER PUBLICATIONS

Ericsson, "QCL for Multi-Shot or Aperiodic CSI-RS," 3GPP TSG-RAN WG1 #86bis, R1-1612674, 2016, 4 pages.

(Continued)

*Primary Examiner* — Habte Mered
(74) *Attorney, Agent, or Firm* — Perkins Coie LLP

(57) ABSTRACT

Provided are a signaling sending method and device and a signaling receiving method and device. The signaling sending method includes: configuring N sets according to reference-signal-related information satisfying a predetermined channel characteristic requirement, where N is an integer greater than or equal to 1, and an element in the N sets is the reference-signal-related information; generating a first type of signaling, where the first type of signaling carries the N sets; and sending the first type of signaling to a second communication node, where the first type of signaling is used for notifying the second communication node to perform beam indication according to the N sets.

14 Claims, 18 Drawing Sheets

(56) References Cited

U.S. PATENT DOCUMENTS

| | | | |
|---|---|---|---|
| 2015/0312919 | A1 | 10/2015 | Lee et al. |
| 2018/0102817 | A1* | 4/2018 | Park .......................... H04B 7/04 |
| 2018/0115355 | A1 | 4/2018 | Nagata et al. |
| 2018/0131426 | A1* | 5/2018 | Lee ....................... H04B 7/0695 |
| 2018/0220317 | A1* | 8/2018 | Yilmaz ............. H04W 28/0268 |
| 2019/0223043 | A1* | 7/2019 | Geng .................. H04W 72/046 |
| 2020/0280417 | A1* | 9/2020 | Lindoff ............... H04W 72/042 |

FOREIGN PATENT DOCUMENTS

| | | |
|---|---|---|
| CN | 106160807 A | 11/2016 |
| WO | 2016163843 A1 | 10/2016 |
| WO | 2016177299 A1 | 11/2016 |

OTHER PUBLICATIONS

European Patent Office, Extended European Search Report and Opinion dated Aug. 11, 2020 for European Patent Application No. 17890537.8, 10 pages.

LG Electronics, "Remaining Details on QCL Assumptions for eFD-MIMO," 3GPP TSG RAN WG1 Meeting #87, R1-1611755 (2016), 3 pages.

Nokia, "On QCL, Rate Matching and DCI Signalling for Aperiodic CSI-RS," 3GPP TSG RAN WG1 Meeting #87, R1-1611282 (2016), 3 pages.

State Intellectual Property Office of the P.R. China, International Search Report and Written Opinion dated Feb. 11, 2018 for International Patent Application No. PCT/CN2017/120347, 6 pages.

Chinese Office Action dated Jul. 24, 2020 for Chinese Patent Application No. 201710014261.2, filed on Jan. 9, 2017 (12 pages).

Chinese Office Action dated Nov. 25, 2020 for Chinese Patent Application No. 201710014261.2, filed on Jan. 9, 2017 (12 pages).

NTT Docomo, Inc., "New Radio (NR) Access Technology," 3GPP TSG RAN Meeting #77, Sapporo, Japan, RP-171783, 284 pages, Sep. 11-14, 2017.

Korean Office Action dated Nov. 23, 2021 for Korean Patent Application No. 10-2019-7023533, filed on Dec. 29, 2017 (13 pages).

Indian Office Action dated Dec. 28, 2021 for Indian Patent Application No. 201937032304, filed on Dec. 29, 2017 (7 pages).

* cited by examiner

SIGNALING SENDING METHOD AND DEVICE, AND SIGNALING RECEIVING METHOD AND DEVICE

CROSS REFERENCE TO RELATED APPLICATIONS

This patent document is a continuation of and claims the benefit of priority to International Patent Application No. PCT/CN2017/120347, filed on Dec. 29, 2017, which claims the benefit of priority of Chinese Patent Application No. 201710014261.2, filed on Jan. 9, 2017. The entire contents of the before-mentioned patent applications are incorporated by reference as part of the disclosure of this application.

TECHNICAL FIELD

The present disclosure relates to the field of communications and, for example, to a signaling sending method and device and a signaling receiving method and device.

BACKGROUND

The high frequency band with ultra-wide bandwidth (i.e., millimeter wave communication) will become an important development direction of the future mobile communication and attracts the attention of the global academia and industry. The advantages of millimeter waves become increasingly attractive with the increasing congestion of the spectrum resources and a huge number of accesses to physical networks. The corresponding standardization work has been started in many standard organizations such as an Institute of Electrical and Electronics Engineers (IEEE) and a 3rd Generation Partnership Project (3GPP). For example, in 3GPP standard groups, high frequency band communications become an important innovation point of a new radio access technology (New RAT) with its significant advantage of wide bandwidths. However, the high frequency band communications also face the challenges of link attenuation, for example, large propagation path losses, large air absorption (especially oxygen) and heavy rain attenuation. Facing these challenges, a high frequency band communication system may acquire high antenna gains and resist signal transmission losses by means of a multi-antenna array and beamforming using characteristics of the high frequency band such as short wavelength and easy antenna integration, thereby ensuring a link margin and improving communication robustness.

In a training process of antenna weights (also referred to as precoding or beams), a high frequency band transmitter transmits a training pilot, and a receiver receives channels and performs channel estimation. The high frequency band receiver needs to feed channel state information back to the transmitter so that the receiver and the transmitter may select, from candidate antenna weight pairs, multiple groups of antenna weight pairs which may be used for multi-channel data transmission, improving overall spectral efficiency.

In a millimeter wave communication system, a beam indication is based on an index of a transmit beam and used for assisting the beam training at the receiver. However, due to user movements and channel changes, an interaction between a user equipment (UE) and a base station will involve various signals, such as a reference signal (RS) for UE mobility, a channel state information-references signal CSI-RS) and a demodulation references signal (DMRS). Meanwhile, to support the beam training, the indexes of the transmit beams need to be continuously updated and replaced, resulting in complicated maintenance. In particular, in the case of multi-path beam maintenance and beam indications, explicit global beam indexes become increasingly difficult to implement.

SUMMARY

The present disclosure provides a signaling sending method and device and a signaling receiving method and device to solve at least the problem in the related art of complex beam indications and beam management.

The present disclosure provides a signaling sending method. The method includes: configuring N sets according to reference-signal-related information satisfying a predetermined channel characteristic requirement, where N is an integer greater than or equal to 1, and an element in the N sets is the reference-signal-related information; generating a first type of signaling, where the first type of signaling carries the N sets; and sending the first type of signaling to a second communication node, where the first type of signaling is used for notifying the second communication node to perform beam indication according to the N sets.

The present disclosure further provides a signaling receiving method. The method includes: receiving a first type of signaling sent by a first communication node, where the first type of signaling carries N sets configured according to reference-signal-related information satisfying a predetermined channel characteristic requirement, where N is an integer greater than or equal to 1, and an element in the N sets is the reference-signal-related information; and performing beam indication according to the N sets.

The present disclosure further provides a signaling sending device. The device includes a configuration module, a generation module and a sending module. The configuration module is configured to configure N sets according to reference-signal-related information satisfying a predetermined channel characteristic requirement, where N is an integer greater than or equal to 1, and an element in the N sets is the reference-signal-related information. The generating module is configured to generate a first type of signaling, where the first type of signaling carries the N sets. The sending module is configured to send the first type of signaling to a second communication node, where the first type of signaling is used for notifying the second communication node to perform beam indication according to the N sets.

The present disclosure further provides a signaling receiving device. The device includes a receiving module and an indication module. The receiving module is configured to receive a first type of signaling sent by a first communication node, where the first type of signaling carries N sets configured according to reference-signal-related information satisfying a predetermined channel characteristic requirement, where N is an integer greater than or equal to 1, and an element in the N sets is the reference-signal-related information. The indication module is configured to perform beam indication according to the N sets.

The present disclosure further provides a storage medium. The storage medium is configured to store program codes for executing the following steps: configuring N sets according to reference-signal-related information satisfying a predetermined channel characteristic requirement, where N is an integer greater than or equal to 1, and an element in the N sets is the reference-signal-related information; generating a first type of signaling, where the first type of signaling carries the N sets; and sending the first type of signaling to a second communication node, where the first type of signaling is used for notifying the second communication node to perform beam indication according to the N sets.

The present disclosure further provides a storage medium. The storage medium is configured to store program codes for executing the following steps: receiving a first type of signaling sent by a first communication node, and performing beam indication according to the N sets. The first type of signaling carries N sets configured according to reference-signal-related information satisfying a predetermined channel characteristic requirement, where N is an integer greater than or equal to 1. An element in the N sets is the reference-signal-related information.

The present disclosure further provides a computer program product including a computer program stored in a non-transient computer-readable storage medium. The computer program includes program instructions which, when executed by a computer, enable the computer to execute any method described above.

In the signaling sending method and device and the signaling receiving method and device provided by the present disclosure, the reference-signal-related information satisfying the predetermined channel characteristic requirement is configured into N sets so that the second communication node may perform beam indications and beam management according to the configured sets, which can solve the problem in the related art that the beam indications and beam management are complex.

DETAILED DESCRIPTION

The terms "first", "second" and the like in the description, claims and above drawings of the present disclosure are used to distinguish between similar objects and are not necessarily used to describe a particular order or sequence.

Embodiment 1

Figure 1:
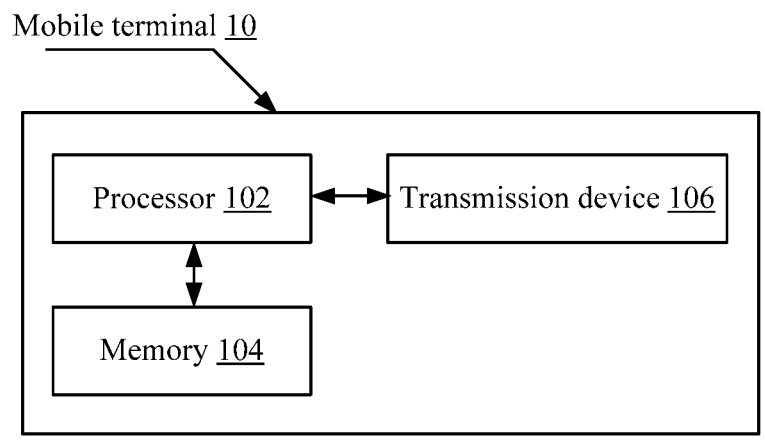
FIG. 1 is a block diagram of a hardware configuration of a mobile terminal according to an embodiment.

The method provided by the embodiment 1 may be executed in a mobile terminal, a computer terminal or other similar computing devices. In an example, the method is executed in the mobile terminal. FIG. 1 is a block diagram of a hardware configuration of a mobile terminal according to this embodiment. The mobile terminal may execute a signaling sending method provided by this embodiment. As shown in FIG. 1, a mobile terminal 10 may include one or more (only one processor is shown in FIG. 1) processors 102 (the processor 102 may include, but is not limited to, a processing device such as a microcontroller unit (MCU) and a field programmable gate array (FPGA)), a memory 104 used for storing data, and a transmission device 106 used for implementing a communication function. The structure shown in FIG. 1 is merely illustrative and not intended to limit the structure of the electronic device described above. For example, the mobile terminal 10 may further include more or fewer components than the components shown in FIG. 1 or may have a configuration different from that shown in FIG. 1.

The memory 104 may be used for storing software programs and modules of application software, such as program instructions/modules corresponding to the signaling sending method in this embodiment. The processor 102 executes the software programs and modules stored in the memory 104 so as to perform various function applications and data processing, that is, to implement the method described above. The memory 104 may include a high-speed random access memory, and may further include a nonvolatile memory, such as one or more magnetic storage devices, flash memories or other nonvolatile solid-state memories. In some examples, the memory 104 may further include memories that are remotely disposed with respect to the processor 102. These remote memories may be connected to the mobile terminal 10 via a network. Examples of the preceding network include, but are not limited to, the Internet, an intranet, a local area network, a mobile communication network and a combination thereof.

The transmission device 106 is configured to receive or send data via a network. Examples of such a network may include a wireless network provided by a communication provider of the mobile terminal 10. In one example, the transmission device 106 includes a network interface controller (NIC), which may be connected to other network equipment via a base station and thus communicate with the Internet. In one example, the transmission device 106 may be a Radio Frequency (RF) module, which is used for communicating with the Internet in a wireless way.

Figure 2:
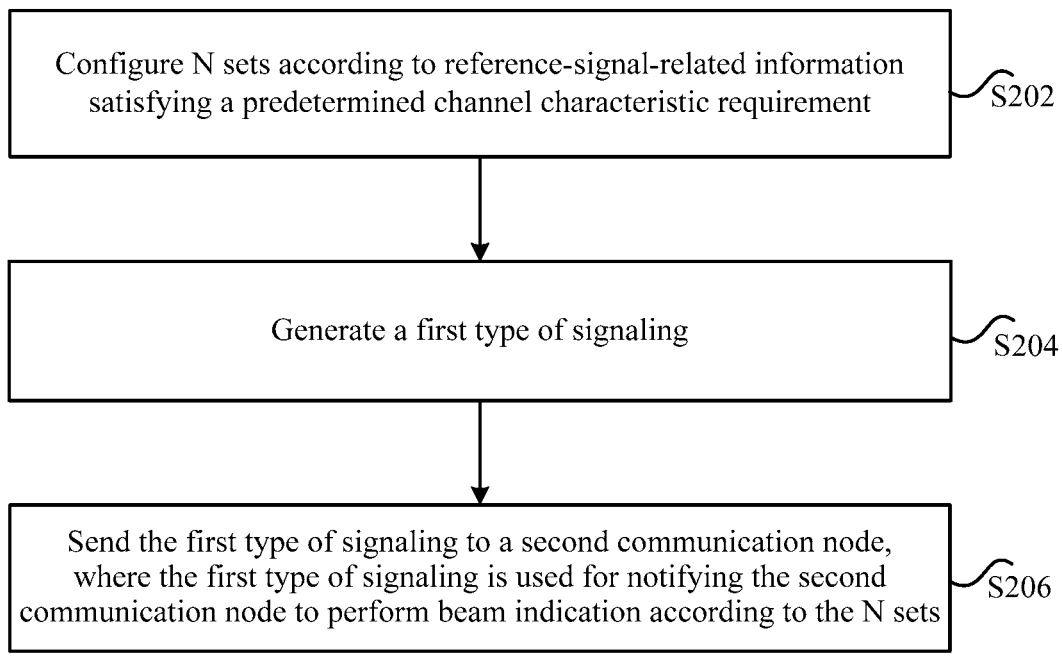
FIG. 2 is a flowchart of a signaling sending method according to an embodiment.

A signaling sending method executed on the preceding mobile terminal is provided in this embodiment. FIG. 2 is a flowchart of a signaling sending method according to this embodiment. As shown in FIG. 2, the method includes steps described below.

In step S202, N sets are configured according to reference-signal-related information satisfying a predetermined channel characteristic requirement, where N is an integer greater than or equal to 1.

The N sets are resource sets and may include the reference-signal-related information, that is, an element in the N sets is the reference-signal-related information.

In step S204, a first type of signaling is generated, where the first type of signaling carries the N sets.

In step S206, the first type of signaling is sent to a second communication node, where the first type of signaling is used for notifying the second communication node to perform beam indication according to the N sets.

In the above steps, the reference-signal-related information satisfying the predetermined channel characteristic requirement is configured into N sets so that the second communication node may perform beam indications and beam management according to the configured sets, which may solve the problem in the related art that the beam indications and beam management are complex.

In an exemplary embodiment, the reference-signal-related information includes at least one of: a beam index, a same reference signal or different reference signals, a same reference signal index or different reference signal indexes, or a same reference signal antenna port or different reference signal antenna ports, where the reference signal index includes an explicit reference signal index or an implicit reference signal index.

For example, the reference signal index includes a time-frequency code resource position or configuration.

In an exemplary embodiment, the predetermined channel characteristic requirement includes at least one of: elements within each of the N sets have a same channel characteristic, or channel characteristics of the elements within each of the N sets satisfy a predetermined constraint.

For example, the elements within each of the N sets may have substantially the same channel characteristic. For another example, the channel characteristic of the elements within each of the N sets satisfy a certain range or a certain difference.

In an exemplary embodiment, the channel characteristic includes one of: quasi-co-location (QCL), a quasi-co-located beam, a reference signal received power, a horizontal transmission azimuth, a vertical transmission azimuth, a horizontal reception azimuth, a vertical reception azimuth, average arrival time, cluster arrival time, a correlation coefficient of time domain channel responses, a correlation coefficient of frequency domain channel responses, a spatial correlation coefficient and characteristics of radio frequency and baseband circuits. The characteristics of radio frequency and baseband circuits include an antenna element pattern, antenna placement, a baseband time offset, a frequency offset and phase noise.

In an exemplary embodiment, the beam includes at least one of a transmit beam or a receive beam.

In an exemplary embodiment, the first type of signaling is further used for notifying the second communication node to perform, according to the N sets, at least one of: indicating a transmission node of the second communication node, where the transmission node includes at least one of a serving transmission node or an interfering service node; or indicating a cell of the second communication node, where the cell includes at least one of a serving cell or an interfering cell.

In an exemplary embodiment, the N sets include at least one of a data set or an interfering set.

A base station corresponding to a first communication node may divide sets included in the N sets into the interfering set and the data set according to traffic.

In an exemplary embodiment, after the first type of signaling is sent to the second communication node, the method further includes reconfiguring the N sets; and sending a second type of signaling to the second communication node, where the second type of signaling carries the reconfigured N sets.

In an exemplary embodiment, reconfiguring the N sets includes at least one of: adding a set to the N sets; deleting an indicated set in the N sets; updating an element within the indicated set in the N sets; or deleting an element within the indicated set in the N sets.

In an exemplary embodiment, after the second type of signaling is sent to the second communication node, the method further includes at least one of: sending a third type of signaling to the second communication node, where the third type of signaling carries information for associating Q sets with Y sets or information for associating the Q sets with elements in the Y sets or information for associating elements in the Q sets with elements in the Y sets; receiving a fourth type of signaling sent by the second communication node, where the fourth type of signaling carries the information for associating the Q sets with the Y sets or the information for associating the Q sets with the elements in the Y sets or the information for associating the elements in the Q sets with the elements in the Y sets; or associating the Q sets with the Y sets or associating the Q sets with the elements in the Y sets or associating the elements in the Q sets with the elements in the Y sets according to a predetermined rule; where Q and Y are integers greater than or equal to 1.

For example, the predetermined rule includes at least one of the following: indexes of multiple sets are within a constraint range or satisfy a specific function relationship; feedback or notification times of multiple sets are within a constraint range; or when a first type of set is configured, a second type of set is associated with a resource type of the first type of set in a default or predefined manner.

In an exemplary embodiment, elements in the associated sets obtained after the association operation satisfy the predetermined channel characteristic requirement.

In an exemplary embodiment, operations related to the associated sets include at least one of: activating part of the associated sets; deactivating part of the associated sets; indicating part of the associated sets; or indicating an element in part of the associated sets.

For example, the operations related to the associated sets include at least one of: activation of one of the associated sets causing activation of another one of the associated sets; deactivation of one of the associated sets causing deactivation of another one of the associated sets; indication of one of the associated sets causing indication of another one of the associated sets; indication of the elements in part of the associated sets causing indication of all or part of the other associated sets; or causing indication of elements in all or part of other management sets.

In an exemplary embodiment, after the second type of signaling is sent to the second communication node, the method further includes activating or deactivating K sets; and sending a fifth type of signaling to the second communication node, where the fifth type of signaling carries the K sets, the K sets belong to at least one of: the N sets or the reconfigured N sets, where K is an integer greater than or equal to 1.

In an exemplary embodiment, activating the K sets includes at least one of: activating the K sets for activated channel measurement sets; activating the K sets for activated demodulation sets; or activating the K sets for activated interfering sets.

In an exemplary embodiment, deactivating the K sets includes at least one of: deactivating the K sets for deactivated channel measurement sets; deactivating the K sets for deactivated demodulation sets; or deactivating the K sets for deactivated interfering sets.

In an exemplary embodiment, before the fifth type of signaling is sent to the second communication node, the method further includes at least one of: numbering sets and/or elements in the sets; grouping the sets and/or the elements in the sets and numbering each group; numbering activated sets and/or elements in the activated sets; or grouping the activated sets and/or the elements in the activated sets and numbering each group. That is, the sets are numbered; the elements in the sets are numbered; the sets are grouped and each group is numbered; the elements in the sets are grouped and each group is numbered; the K activated sets are numbered; at least one element in the K activated sets is numbered; the K activated sets are grouped and each group is numbered; the elements in the K activated sets are grouped and each group is numbered.

In an exemplary embodiment, after the fifth type of signaling is sent to the second communication node, the method further includes sending a sixth type of signaling to the second communication node, where the sixth type of signaling carries a set of numbers indicating time-frequency code resource transmissions or an element in the set or an activated set or an element in the activated set; or receiving a seventh type of signaling sent by the second communication node, where the seventh type of signaling carries the set of numbers indicating time-frequency code resource transmissions or the element in the set or the activated set or the element in the activated set.

In an exemplary embodiment, the numbers are transmitted through at least one of: a time-frequency code resource carrying index-associated information, an explicitly outputted index value, or joint encoding of the time-frequency code resource carrying the index-associated information and an explicitly outputted correlation value.

In an exemplary embodiment, a number of bits occupied by the sixth type of signaling is acquired according to a number of activated sets or a number of elements in the activated set.

In an exemplary embodiment, a number of bits occupied by the seventh type of signaling is acquired according to the number of activated sets or the number of elements in the activated set.

In an exemplary embodiment, the time-frequency code resource includes at least one of: one or more types of reference signal and a time-frequency code resource corresponding to the one or more types of reference signal; a time-frequency code resource in a control channel; or a time-frequency code resource in a data channel.

In an exemplary embodiment, the sixth type of signaling indicates first candidate sets or elements to enable the second communication node to detect a used set or element from the first candidate sets or elements.

In an exemplary embodiment, the seventh type of signaling indicates second candidate sets or elements for detecting the used set or element from the second candidate sets or elements.

In an exemplary embodiment, the sixth type of signaling or the seventh type of signaling is further used for at least one of: indicating a predetermined set for a channel measurement resource; indicating the predetermined set for a demodulation resource; indicating the predetermined set for an interference measurement resource; indicating an element in the predetermined set for the channel measurement resource; indicating the element in the predetermined set for the demodulation resource; or indicating the element in the predetermined set for the interference measurement resource.

In an exemplary embodiment, before the N sets are configured according to the reference-signal-related information satisfying the predetermined channel characteristic requirement, the method further includes sending an eighth type of signaling to the second communication node, where the eighth type of signaling carries a configured set of channel characteristic requirements; or receiving a ninth type of signaling sent by the second communication node, where the ninth type of signaling is used for indicating the configured set of channel characteristic requirements.

In an exemplary embodiment, the predetermined channel characteristic requirement is an element in the set of channel characteristic requirements.

In an exemplary embodiment, before the N sets are configured according to the reference-signal-related information satisfying the predetermined channel characteristic requirement, the method further includes sending a tenth type of signaling to the second communication node, where the tenth type of signaling carries a subset of an activated set of channel characteristic requirements; or receiving an eleventh type of signaling sent by the second communication node, where the eleventh type of signaling is used for indicating the activated subset of the set of channel characteristic requirements.

In an exemplary embodiment, the predetermined channel characteristic requirement is an element in the subset of the set of channel characteristic requirements.

In an exemplary embodiment, the first type of signaling, the second type of signaling, the third type of signaling and the fourth type of signaling are configured as the first type of set, and the fifth type of signaling and the sixth type of signaling are configured as the second type of set, where the second type of set is a subset of the first type of set.

The seventh type of signaling and the eighth type of signaling select are a set selected from the second type of set or elements in the set selected from the second type of set.

In an exemplary embodiment, antenna ports of the first communication node satisfy the predetermined channel characteristic requirement; or antenna ports of the second communication node satisfy the predetermined channel characteristic requirement; or the antenna port of the first communication node and the antenna port of the second communication node satisfy the predetermined channel characteristic requirement.

In an exemplary embodiment, the channel characteristic requirement is a channel characteristic requirement determined according to whether its hard decision is satisfied or not or a channel characteristic requirement determined according to whether its soft satisfaction decision is satisfied or not. The hard decision and the soft decision reflect a degree to which the channel characteristic is satisfied, including that the channel characteristic requirement is completely satisfied and the channel characteristic requirement is partially satisfied. For example, the output of the hard decision is the channel characteristic requirement is satisfied or the channel characteristic requirement is not satisfied. The output of the soft decision is the satisfying condition of the channel characteristic. For example, spatial correlation is taken as an indicator of the channel characteristic requirement, and a quantized value or an unquantized value of the spatial correlation (an optional range is from 0 to 1, where 0 denotes completely un-correlated and 1 denotes completely correlated) is taken as the output of the soft decision, e.g., the output of the soft decision is 0.1. Alternatively, a threshold for determining the channel characteristic requirement is completely satisfied is greater than 0.9, a threshold for determining the channel characteristic requirement is partially satisfied is less than or equal to 0.9 and greater than 0.5, and a threshold for determining the channel characteristic requirement is not satisfied is less than 0.5.

Figure 3:
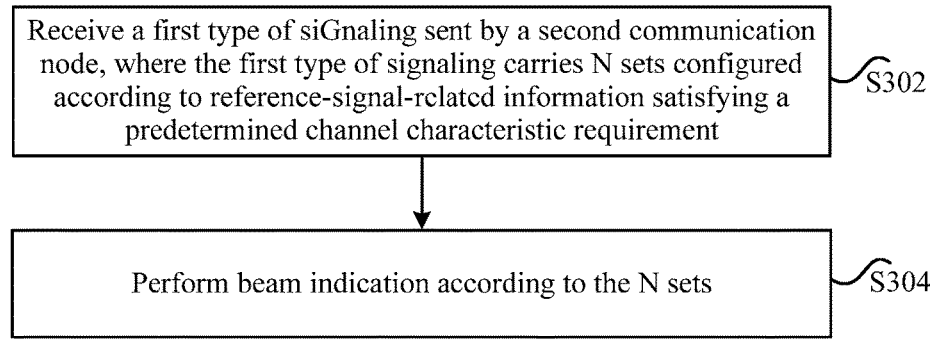
FIG. 3 is a flowchart of a signaling receiving method according to an embodiment.

FIG. 3 is a flowchart of a signaling receiving method according to this embodiment. A second communication node in this embodiment may be the first communication node provided by the embodiment described above. As shown in FIG. 3, the method includes steps described below In step S302, a first type of signaling sent by the second communication node is received, where the first type of signaling carries N sets configured according to reference-signal-related information satisfying a predetermined channel characteristic requirement, where N is an integer greater than or equal to 1.

In step S304, beam indication is performed according to the N sets.

In an exemplary embodiment, the reference-signal-related information includes at least one of a beam index, a same reference signal or different reference signals, a same reference signal index or different reference signal indexes, or a same reference signal antenna port or different reference signal antenna ports, where the reference signal index includes an explicit reference signal index or an implicit reference signal index.

For example, the reference signal index includes a time-frequency code resource position or configuration.

In an exemplary embodiment, the predetermined channel characteristic requirement includes at least one of: elements within each of the N sets having a same channel characteristic or channel characteristics of the elements within each of the N sets satisfying a predetermined constraint.

For example, the elements within each of the N sets may have substantially the same channel characteristic. For another example, the channel characteristics of the elements within each of the N sets may satisfy a certain range or a certain difference.

In an exemplary embodiment, the channel characteristic includes one of: quasi-co-location (QCL), a quasi-co-located beam, a reference signal received power, a horizontal transmission azimuth, a vertical transmission azimuth, a horizontal reception azimuth, a vertical reception azimuth, average arrival time, cluster arrival time, a correlation coefficient of time domain channel responses, a correlation coefficient of frequency domain channel responses, a spatial correlation coefficient or characteristics of radio frequency and baseband circuits. The characteristics of radio frequency and baseband circuits include an antenna element pattern, antenna placement, a baseband time offset, a frequency offset and phase noise.

In an exemplary embodiment, the beam includes a transmit beam and/or a receive beam.

In an exemplary embodiment, the N sets are further used for at least one of: indicating a transmission node, where the transmission node includes a serving transmission node and/or an interfering service node; or indicating a cell, where the cell includes a serving cell and/or an interfering cell.

In an exemplary embodiment, the N sets include a data set and/or an interfering set.

In an exemplary embodiment, after the first type of signaling sent by the second communication node is received, the method further includes receiving a second type of signaling sent by the second communication node, where the second type of signaling carries sets by reconfiguring the N sets.

In an exemplary embodiment, after the first type of signaling sent by the second communication node is received, the method further includes reconfiguring the N sets; and sending a third type of signaling to the second communication node, where the third type of signaling carries the reconfigured N sets.

In an exemplary embodiment, reconfiguring the N sets includes at least one of: adding a set to the N sets; deleting an indicated set in the N sets; updating an element within the indicated set in the N sets; or deleting an element within the indicated set in the N sets.

In an exemplary embodiment, after the third type of signaling is sent to the second communication node, the method further includes at least one of: sending a fourth type of signaling to the second communication node, where the fourth type of signaling carries information for associating Q sets with Y sets or information for associating the Q sets with elements in the Y sets or information for associating elements in the Q sets with elements in the Y sets; receiving a fifth type of signaling sent by the second communication node, where the fifth type of signaling carries the information for associating the Q sets with the Y sets or the information for associating the Q sets with the elements in the Y sets or the information for associating the elements in the Q sets with the elements in the Y sets; or associating the Q sets with the Y sets or associating the Q sets with the elements in the Y sets or associating the elements in the Q sets with the elements in the Y sets according to a predetermined rule; where Q and Y are integers greater than or equal to 1.

For example, the predetermined rule includes at least one of the following: indexes of multiple sets are within a constraint range or satisfy a specific function relationship; feedback or notification times of multiple sets are within a constraint range; or when a first type of set is configured, a second type of set is associated with a resource type of the first type of set in a default or predefined manner.

In an exemplary embodiment, elements in the associated sets satisfy the predetermined channel characteristic requirement.

In an exemplary embodiment, operations related to the associated sets include at least one of: activating part of the associated sets; deactivating part of the associated sets;

indicating part of the associated sets; or indicating an element in part of the associated sets.

For example, the operations related to the associated sets include at least one of: activation of part of the associated sets causing activation of all or part of other associated sets; deactivation of part of the associated sets causing deactivation of all or part of the other associated sets; indication of part of the associated sets causing indication of all or part of the other associated sets; or indication of the elements in part of the associated sets causing indication of all or part of the other associated sets or causing indication of elements in all or part of other associated sets.

In an exemplary embodiment, after the third type of signaling is sent to the second communication node, the method further includes activating or deactivating K sets; and sending a sixth type of signaling to the second communication node, where the sixth type of signaling carries the K sets, the K sets belong to the N sets and/or the reconfigured N sets, and K is an integer greater than or equal to 1.

In an exemplary embodiment, activating the K sets includes at least one of: activating the K sets for activated channel measurement sets; activating the K sets for activated demodulation sets; or activating the K sets for activated interfering sets.

In an exemplary embodiment, deactivating the K sets includes at least one of: deactivating the K sets for deactivated channel measurement sets; deactivating the K sets for deactivated demodulation sets; or deactivating the K sets for deactivated interfering sets.

In an exemplary embodiment, before the sixth type of signaling is sent to the second communication node, the method further includes at least one of: numbering sets and/or elements in the sets; grouping the sets and/or the elements in the sets and numbering each group; numbering activated sets and/or elements in the activated sets; or grouping the activated sets and/or the elements in the activated sets and numbering each group.

In an exemplary embodiment, after the sixth type of signaling is sent to the second communication node, the method further includes sending a seventh type of signaling to the second communication node, where the seventh type of signaling carries a set of numbers indicating time-frequency code resource transmissions or an element in the set or an activated set or an element in the activated set; or receiving an eighth type of signaling sent by the second communication node, where the eighth type of signaling carries the set of numbers indicating time-frequency code resource transmissions or the element in the set or the activated set or the element in the activated set.

In an exemplary embodiment, the numbers are transmitted through at least one of: a time-frequency code resource carrying index-associated information, an explicitly outputted index value, or joint encoding of the time-frequency code resource carrying the index-associated information and an explicitly outputted correlation value.

In an exemplary embodiment, a number of bits occupied by the seventh type of signaling is acquired according to a number of activated sets or a number of elements in the activated set.

In an exemplary embodiment, a number of bits occupied by the eighth type of signaling is acquired according to the number of activated sets or the number of elements in the activated set.

In an exemplary embodiment, the time-frequency code resource includes at least one of: one or more types of reference signal and a time-frequency code resource corresponding to the one or more types of reference signal; a time-frequency code resource in a control channel; or a time-frequency code resource in a data channel.

In an exemplary embodiment, the seventh type of signaling indicates first candidate sets or elements to enable the second communication node to detect a used set or element from the first candidate sets or elements.

In an exemplary embodiment, the eighth type of signaling indicates second candidate sets or elements for detecting the used set or element from the second candidate sets or elements.

In an exemplary embodiment, the seventh type of signaling or the eighth type of signaling is further used for at least one of: indicating a predetermined set for a channel measurement resource; indicating the predetermined set for a demodulation resource; indicating the predetermined set for an interference measurement resource; indicating an element in the predetermined set for the channel measurement resource; indicating the element in the predetermined set for the demodulation resource; or indicating the element in the predetermined set for the interference measurement resource.

In an exemplary embodiment, before the first type of signaling sent by the second communication node is received, the method further includes sending a ninth type of signaling to the second communication node, where the ninth type of signaling carries a configured set of channel characteristic requirements; or receiving a tenth type of signaling sent by the second communication node, where the tenth type of signaling is used for indicating the configured set of channel characteristic requirements.

In an exemplary embodiment, the predetermined channel characteristic requirement is an element in the set of channel characteristic requirements.

In an exemplary embodiment, before the first type of signaling sent by the second communication node is received, the method further includes sending an eleventh type of signaling to the second communication node, where the eleventh type of signaling carries an activated subset of a set of channel characteristic requirements; or receiving a twelfth type of signaling sent by the second communication node, where the twelfth type of signaling is used for indicating the activated subset of the set of channel characteristic requirements.

In an exemplary embodiment, the predetermined channel characteristic requirement is an element in the subset of the set of channel characteristic requirements.

In an exemplary embodiment, the first type of signaling, the second type of signaling, the third type of signaling and the fourth type of signaling are configured as the first type of set, and the fifth type of signaling and the sixth type of signaling are configured as the second type of set, where the second type of set is a subset of the first type of set. The seventh type of signaling and the eighth type of signaling are a set selected from the second type of set or elements in the set selected from the second type of set.

In an exemplary embodiment, antenna ports of the first communication node satisfy the predetermined channel characteristic requirement; or antenna ports of the second communication node satisfy the predetermined channel characteristic requirement; or the antenna port of the first communication node and the antenna port of the second communication node satisfy the predetermined channel characteristic requirement.

In an exemplary embodiment, the channel characteristic requirement is a channel characteristic requirement whether its hard decision is satisfied or not or a channel characteristic requirement whether its soft satisfaction is satisfied or not.

The hard decision and the soft decision reflect a satisfying degree of the channel characteristic, including completely satisfying the channel characteristic requirement and partially satisfying the channel characteristic requirement.

For example, the reference signal includes at least one of: a cell reference signal (CRS), a channel state information-reference signal (CSI-RS), a CSI-RS for beam management, a channel state information-interference measurement (CSI-IM) signal, a demodulation reference signal (DMRS), a sounding reference signal (SRS), a phase tracking-reference signal (PT-RS), a reference signal for mobility, a beam reference signal (BRS), or a beam refinement reference signal (BRRS).

According to the embodiments described above, provided is a method and device for configuring channel characteristics of a reference signal or an antenna port in a high frequency band 5G mobile communication scenario or a millimeter wave communication scenario. At least one of the reference signal, a time-frequency code resource index of the reference signal or the antenna port is configured as one or more resource sets. The elements in the resource set satisfies a channel characteristic requirement, such as a quasi-co-location (QCL) relationship. The resource sets are maintained, updated and indicated through a multi-layer architecture, thereby implementing beam indications and beam management. In the embodiments described above, no global beam index is used for beam indication, and antenna ports under the same reference signal or beam associations under different reference signals may be flexibly extended or revised. On the other hand, based on the sets each of which shares the channel characteristic, a transceiver system may flexibly obtain diversity and multiplexing gains.

Terms in the embodiments described above are described in detail below.

The channel characteristic includes characteristics of a physical propagation channel, such as a horizontal transmission azimuth, a vertical transmission azimuth, a horizontal reception azimuth and a vertical reception azimuth, and also includes characteristics of radio frequency and baseband circuits, such as an antenna element pattern, antenna placement, a baseband time offset, a frequency offset and phase noise.

The beam may be a resource (such as precoding at a sending end, precoding at a receiving end, the antenna port, an antenna weight vector and an antenna weight matrix). A beam symbol may be replaced with a resource index because the beam may be bound to some time-frequency code resources during transmission. The beam may also be a transmission (sending/receiving) mode. The transmission mode may include space multiplexing, frequency domain or time domain diversity and the like.

The receive beam indication means that the sending end may indicate the receive beam through a quasi-co-location (QCL) assumption between a current reference signal as well as antenna port and the reference signal as well as the antenna port fed back and reported by a UE.

The receive beam refers to a beams of the receiving end which does not need to be indicated, or beam resources of the receiving end which are indicated by the sending end through the QCL between the current reference signal as well as antenna port and the reference signal as well as the antenna port fed back and reported by the UE.

A channel parameter involved in the QCL at least includes a Doppler spread, a Doppler shift, a delay spread, an average delay, or an average gain.

Figure 4:
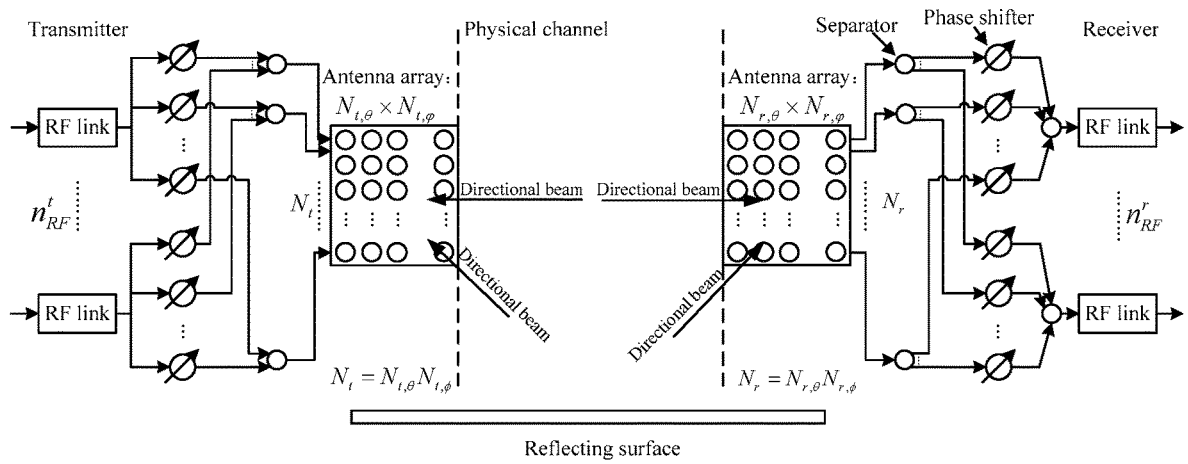
FIG. 4 is a structural diagram of a transceiver based on hybrid precoding (hybrid analog and digital beamforming) according to an embodiment.

To facilitate the understanding of the embodiments described above, a framework where the above embodiments may be applied is described in detail below. FIG. 4 is a structural diagram of a transceiver based on hybrid precoding (hybrid analog and digital beamforming) according to this embodiment. As shown in FIG. 4, the transmitter and the receiver of a system are provided with multiple antenna units and multiple RF links. Each RF link is connected to an antenna array unit (a partial connection scenario is not excluded), and each antenna unit has a digital keying phase shifter. A high frequency band system implements beamforming of an analog end by loading a different phase shift on a signal of each antenna unit. The hybrid beamforming transceiver has multiple RF signal streams. Each signal stream is loaded by using the digital keying phase shifter AWV and sent from the multiple antenna units to a high frequency band physical propagation channel. At the receiving end, RF signal streams received by the multiple antenna units are weighted and combined into a single signal stream, and after radio frequency demodulation is perform at the receiving end, the receiver finally obtains multiple received signal streams which are sampled and received by a digital baseband. Therefore, the hybrid precoding (hybrid analog and digital beamforming) transceiver may simultaneously generate RF beams in multiple directions.

In the embodiments described above, the second communication node may be a user equipment (UE), and in the example described below the second communication node is the UE.

Figure 5:
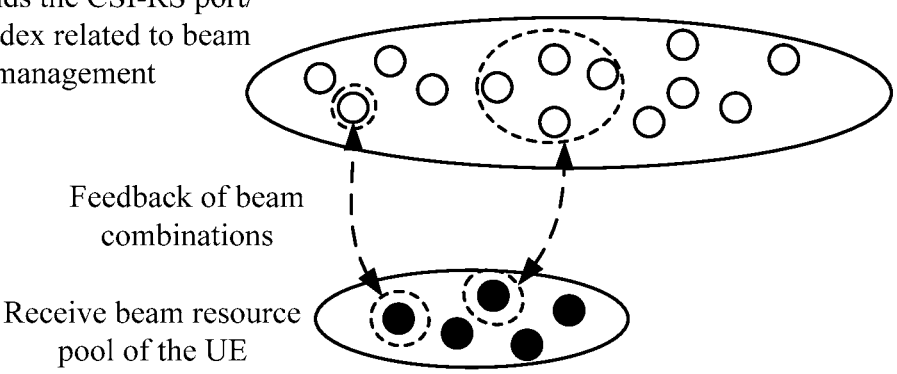
FIG. 5 is a schematic diagram 1 of a measurement result report for beam scanning according to an embodiment.

FIG. 5 is a schematic diagram of a measurement result report for beam scanning according to this embodiment. As shown in FIG. 5, in beam training, a transmission reference point (TRP) and the UE scan available beam sets. The beam scanning includes scanning by the transmitter alone, scanning by the receiver along and joint scanning of the transmitter and receiver. As shown in FIG. 5, a reference signal under a CSI-RS port/beam index related to beam management is sent so that the receiving end, the UE, performs reception by scanning the receive beams in a receive beam resource pool. According to a measurement result, the UE feedbacks information on beam combinations. As shown in FIG. 5, the UE groups transmit beams that share the same receive beam, and indicates a shared channel characteristic (e.g., the QCL) between the CSI-RS ports or the beam indexes of the TRP, to help the TRP establish association between the receive beams and transmit beams, including a receive beam indication based on group information. The TRP may notify the UE of the type of feedback information of the UE and a rule for dividing the transmit beams of the shared channel information. Alternatively, the UE reports the rule for dividing the transmit beams of the shared channel information.

Figure 6:
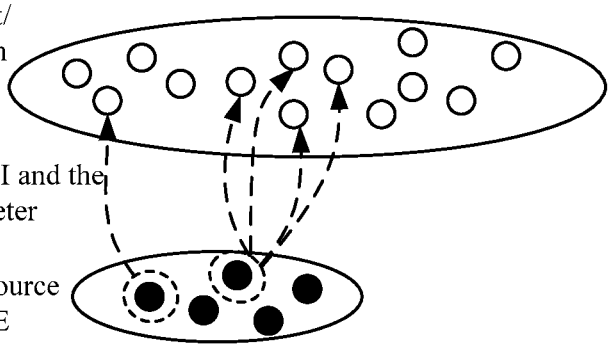
FIG. 6 is a schematic diagram 2 of a measurement result report for beam scanning according to an embodiment.

FIG. 6 is a schematic diagram of a measurement result report for beam scanning according to this embodiment. As shown in FIG. 6, it is similar to a type shown in FIG. 5, but the UE does not group beams at the sending end and provides feedback based on groups. However, the UE provides feedback for all effective beams, including CSI and spatial parameter information (such as an angle of arrival (AoA) and a spatial correlation). Based on the CSI and the spatial parameter information, the TRP may perform a quasi-co-location (QCL) assumption on beams sharing a specific channel characteristic.

Figure 7:
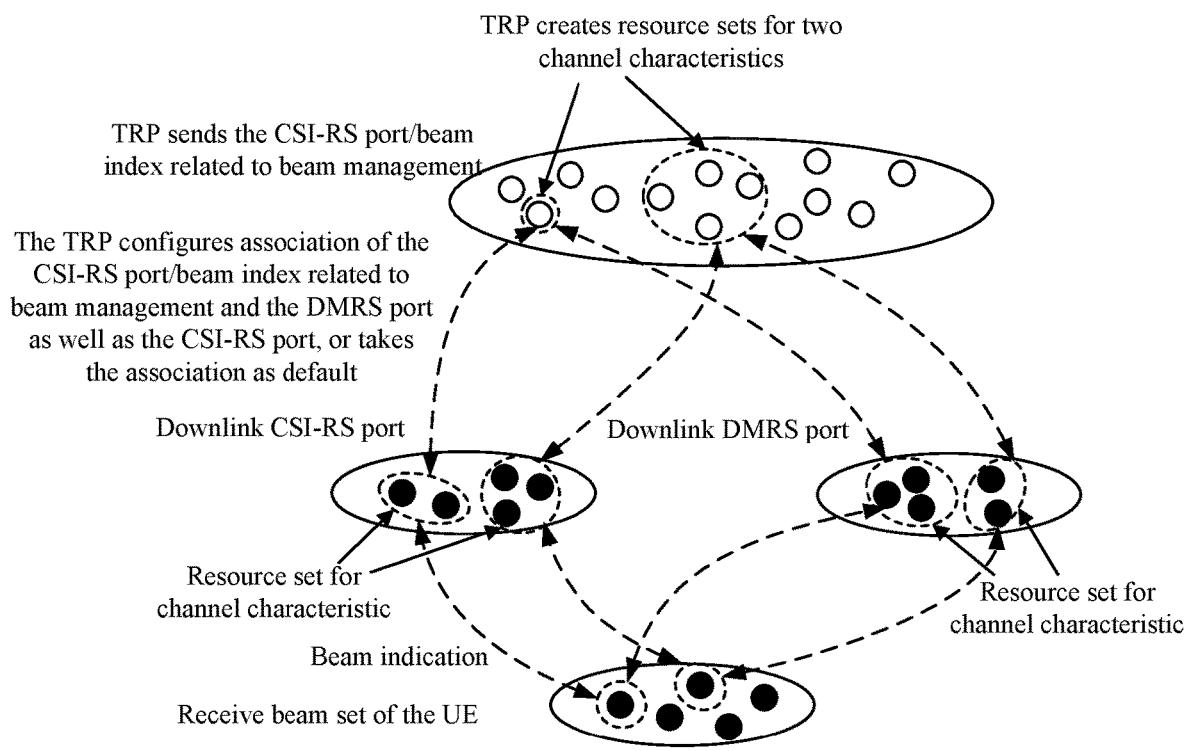
FIG. 7 is a schematic diagram showing creation and association of channel characteristic based on resource sets according to an embodiment.

FIG. 7 is a schematic diagram showing creation and association of resource sets based on channel characteristics according to this embodiment. As shown in FIG. 7, according to a QCL assumption of CSI-RS ports or beam indexes fed back by the UE, or according to detail CSI fed back by the UE, the TRP creates a channel characteristic constraint assumption (e.g., the QCL) to which the CSI-RS port/beam index related to beam management, a downlink CSI-RS port and a downlink DMRS port conform. That is, the TRP configures the association of the CSI-RS port/beam index related to beam management and the DMRS port as well as the CSI-RS port or takes the association as default, and notifies the UE of the information. Therefore, for a single UE, the downlink CSI-RS port and the downlink DMRS port may have different channel characteristic constraint assumptions (e.g., the QCL) for control or beam indications in a data transmission stage. The system may use two different pairs of transmit and receive beams for data transmission, as shown in FIG. 7.

Figure 8:
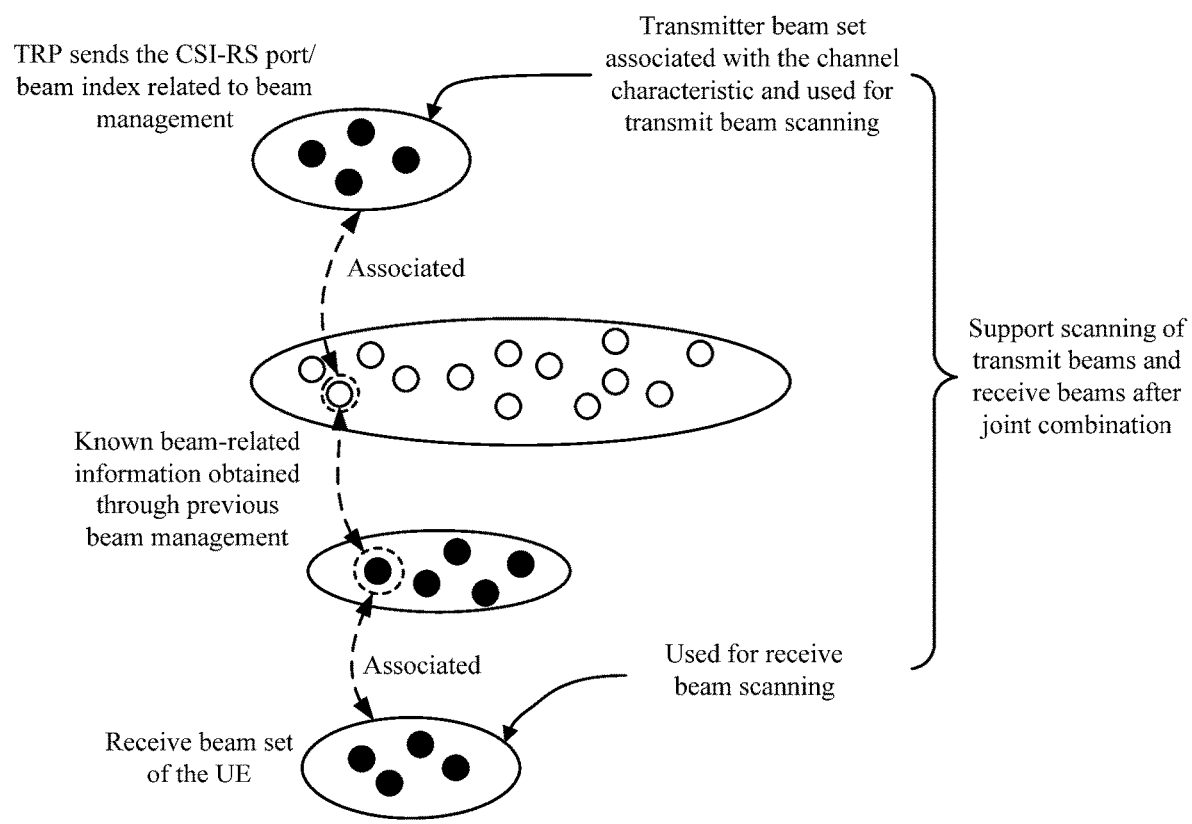
FIG. 8 is a schematic diagram of beam scanning based on a resource set indication according to an embodiment.

FIG. 8 is a schematic diagram of beam scanning based on a resource set indication according to this embodiment. As shown in FIG. 8, with known beam-related information obtained through previous beam management, a downlink receive beam may be indicated between the TRP and UE according to a channel characteristic requirement assumption (e.g., the QCL). Accordingly, for beam refinement, beam tracking, and other purposes, the TRP and the UE may further perform training on transmit beams and receive beams. In this case, based on the channel characteristic constraint assumption (e.g., QCL), the TRP creates a set of transmit beams of the sending end associated with a channel characteristic and the set of transmit beams are used for scanning transmit beams. Meanwhile, the UE may associate a set of receive beams of the UE for receive beam scanning based on the channel characteristic constraint assumption (e.g., QCL). After the sets are combined, combined beam scanning of the sending and receiving ends may be supported under an indication of the channel characteristic constraint assumption (e.g., QCL).

A detail description is given below by using an example in which the TRP configures sets following the channel characteristics at two layers (configuration+indication) or three layers (configuration+activation+indication).

Figure 9:
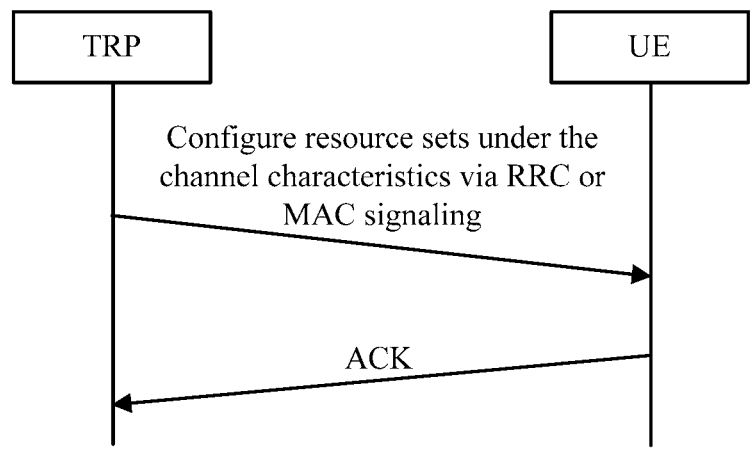
FIG. 9 is a schematic diagram in which a transmission reference point (TRP) configures resource sets conforming to a channel characteristic according to an embodiment.

FIG. 9 is a schematic diagram in which a TRP configures resource sets conform to g a channel characteristic according to this embodiment. As shown in FIG. 9, according to channel and beam-related information feedback from the UE or a resource scheduling requirement, the TRP may configure the resource sets based on the channel characteristic via radio resource control (RRC) or medium access control (MAC) signaling, and the UE feeds back whether the resource sets have been successfully received through acknowledgement (ACK) information. One or more resource sets may be configured, and each set may include the same reference signal or multiple types of reference signal.

Figure 10:
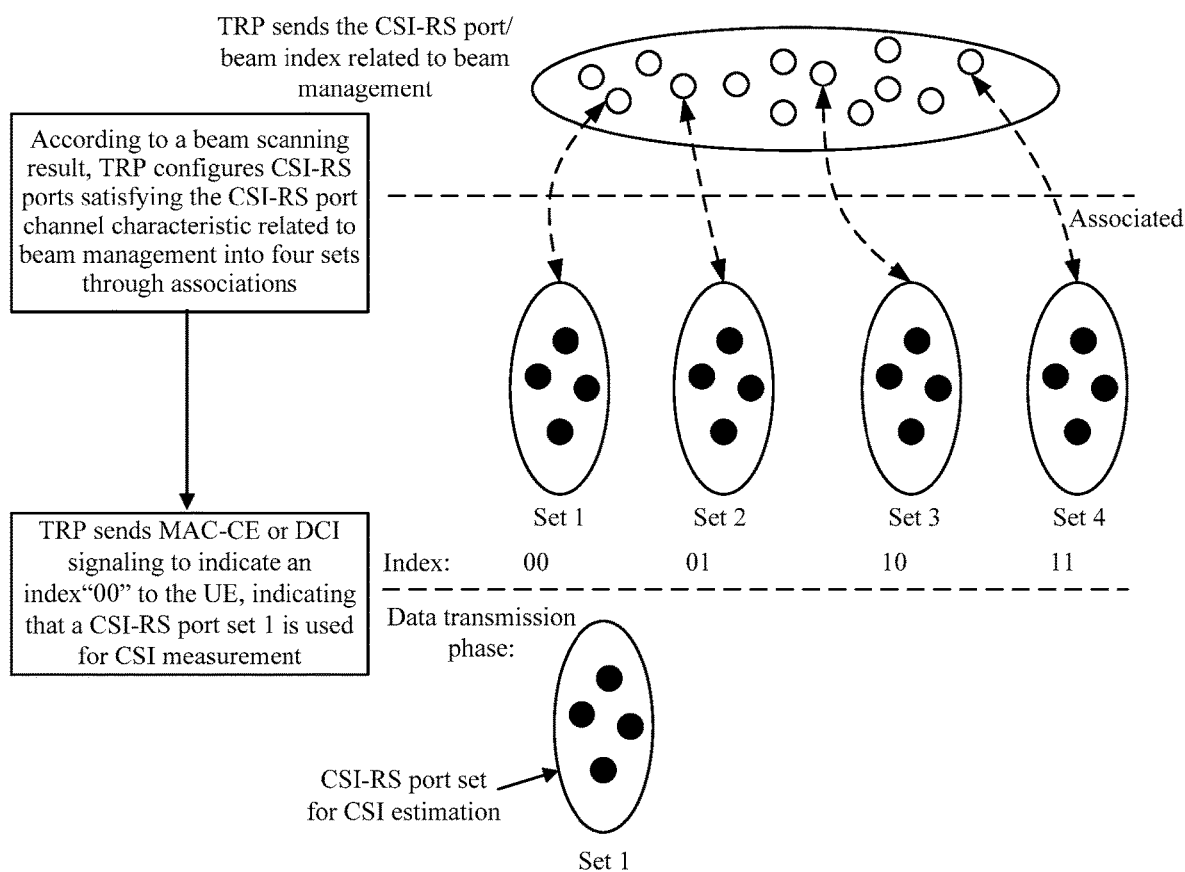
FIG. 10 is a schematic diagram of a resource indication based on resource sets configured by a TRP according to an embodiment.

FIG. 10 is a schematic diagram of a resource indication based on resource sets configured by a TRP according to this embodiment. As shown in FIG. 10, for a set of CSI-RS ports/beam indexes related to beam management sent by the TRP, the TRP obtains, through the beam scanning, corresponding beams and a CSI result fed back by the UE. According to a beam scanning result, the TRP configures CSI-RS ports satisfying the channel characteristics of the CSI-RS ports related to beam management into four sets through associations. The four sets are encoded such as Binary-Coded Decimal (BCD) codes by a direct indication or predefinition method. Then, the TRP sends MAC-CE or downlink control information (DCI) signaling to indicate a number "00" to the UE, indicating that a CSI-RS port set 1 is used for CSI measurement. Since elements in the set of CSI-RS ports/beam indexes related to beam management are associated (e.g., QCL), an indication of the receive beams of the UE is implemented.

Figure 11:
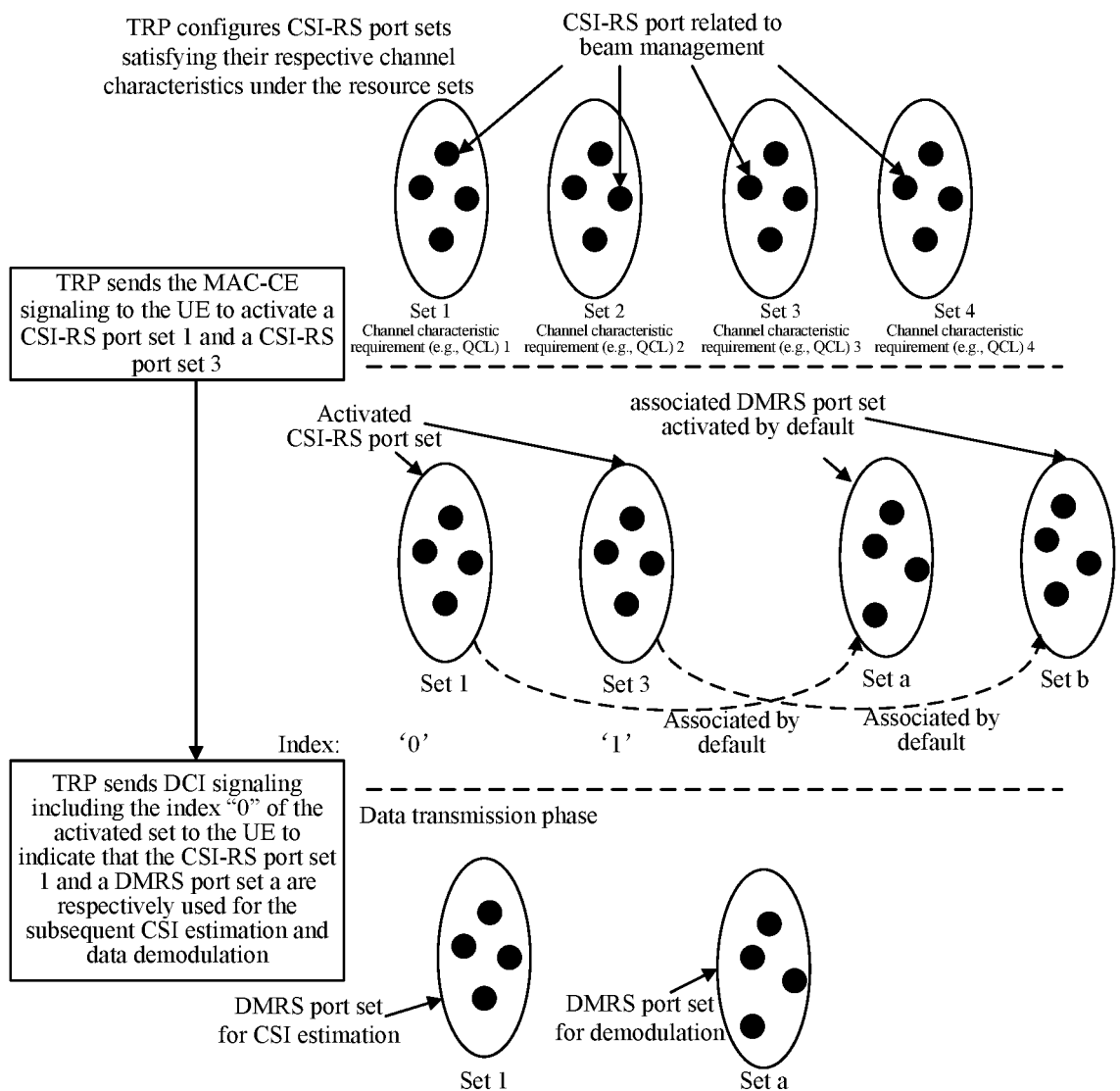
FIG. 11 is a schematic diagram of resource activation and indication based on resource sets configured by a TRP according to an embodiment.

FIG. 11 is a schematic diagram of resource activation and indication based on resource sets configured by a TRP according to this embodiment. As shown in FIG. 11, an activation operation is added here compared with the solution shown in FIG. 10. Since it needs to consider multiple kinds of reference signals, management of multiple transmit beams, scheduling of time-frequency resource pairs and the like, a base station may configure many resource sets for a specific channel characteristic, and an activation method may effectively improve flexibility. For example, the TRP configures CSI-RS port sets satisfying their respective channel characteristics under the resource sets. Each set includes the CSI-RS ports related to beam management, and thus other ports and ports in the same set satisfy a specific channel characteristic requirement (e.g., QCL). The TRP sends the MAC-CE signaling to the UE to activate a CSI-RS port set 1 and a CSI-RS port set 3, and only the sets 1 and 3 are encoded. By an association method, each CSI-RS set is associated with a DMRS port set satisfying the same channel characteristic requirement (e.g., QCL) quickly, and the associated DMRS port set is also activated by default. Finally, the TRP sends DCI signaling including a number 0 of the activated set to the UE to indicate that the CSI-RS port set 1 and a DMRS port set a are respectively used for subsequent CSI estimation and data demodulation.

A detail description is given below by using an example in which the UE configures channel characteristic sets at two layers (configuration+indication) or three layers (configuration+activation+indication).

Figure 12:
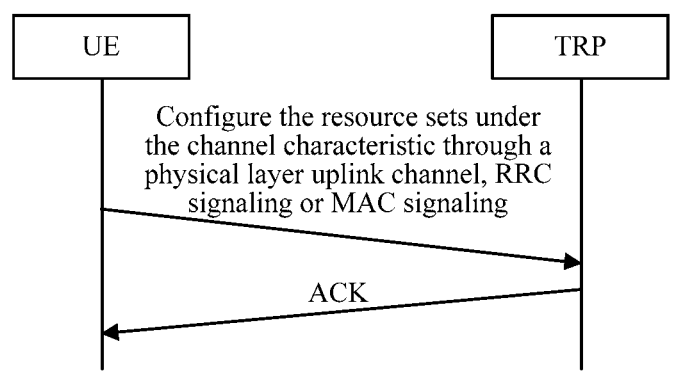
FIG. 12 is a schematic diagram showing that a UE configures resource sets conforming to a channel characteristic according to an embodiment.

FIG. 12 is a schematic diagram showing that a UE configures a resource set satisfying a channel characteristic according to this embodiment. As shown in FIG. 12, according to a measurement result of channel and beam-related information, the UE configures the resource sets satisfy the channel characteristic through a physical layer uplink channel (such as a PUCCH and a PUSCH), RRC signaling or MAC signaling, and the TRP feeds back whether the reception is successful through the information like ACK information. One or more resource sets may be configured, and each set may include the same reference signal or multiple types of reference signal.

Figure 13:
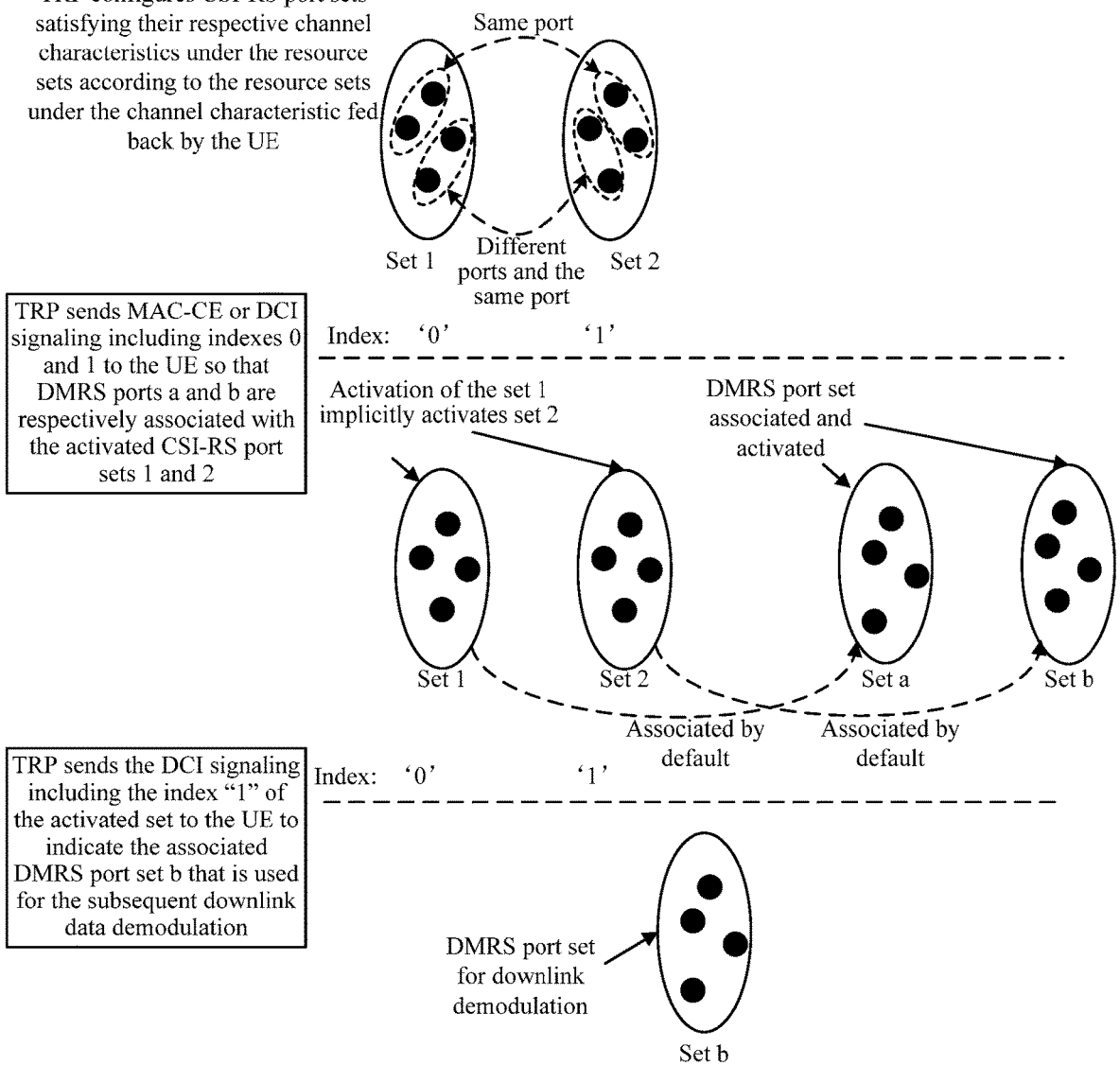
FIG. 13 is a schematic diagram of resource activation and indication based on resource sets configured by a UE according to an embodiment.

FIG. 13 is a schematic diagram of resource activation and indication based on resource sets configured by a UE according to this embodiment. As shown in FIG. 13, according to information fed back by the UE which is about the resource sets of the transmitting channel characteristic, the TRP and the UE jointly configure CSI-RS port sets satisfying their respective channel characteristics from the resource sets. Two resource sets may have some same ports but have some different ports, which means that each set satisfies the specific channel characteristic requirement (e.g., QCL), but the two sets cannot be combined into one bigger set satisfying a common characteristic. For example, a set 1 corresponds to a specific receive beam of the receiving end and a set 2 corresponds to another receive beam of the receiving end, but some TRP ports can perform effective reception by using the two receive beams. Then, the TRP sends the MAC-CE or DCI signaling including numbers 0 and 1 to the UE so that DMRS port sets a and b are respectively associated with the activated CSI-RS port sets 1 and 2. The TRP sends the DCI signaling including a number 1 of the activated set to the UE to indicate that the associated DMRS port set b is used for subsequent downlink data demodulation.

Figure 14:
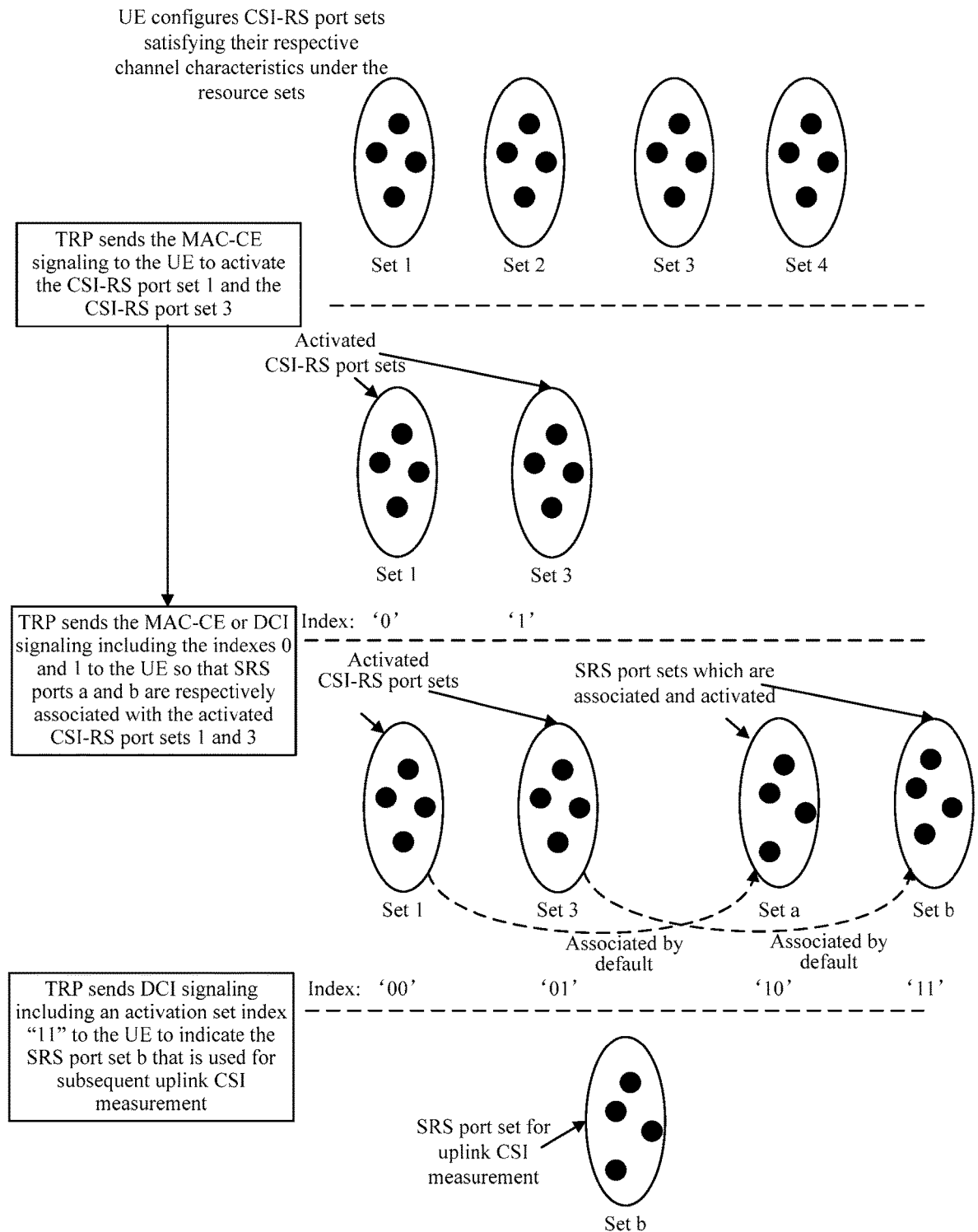
FIG. 14 is another schematic diagram of resource activation and indication based on resource sets configured by a UE according to an embodiment.

FIG. 14 is another schematic diagram of resource activation and indication based on resource sets configured by a UE according to this embodiment. As shown in FIG. 14, according to the resource sets satisfying the channel characteristic (multiple PSS/SSS/mobility RS/CRS/CSI-RS port sets for feeding back the QCL) configured by the UE, the TRP configures CSI-RS port sets satisfying their respective channel characteristics under the resource sets via the RRC signaling. The TRP sends the MAC-CE signaling to the UE to activate CSI-RS port sets 1 and 3, and then the TRP sends the MAC-CE or DCI signaling including the numbers 0 and 1 to the UE so that SRS port sets a and b are respectively associated with the activated CSI-RS port sets 1 and 3. All the activated sets are re-encoded (for example, BCD), and the TRP sends the DCI signaling including a number 11 of the activation set to the UE to indicate that the SRS port set b is used for subsequent uplink CSI measurement, includes supporting uplink beam scanning.

A description is given below by using an example in which the UE and the TRP jointly configure the channel characteristic set at two layers (configuration+indication) or three layers (configuration+activation+indication).

Figure 15:
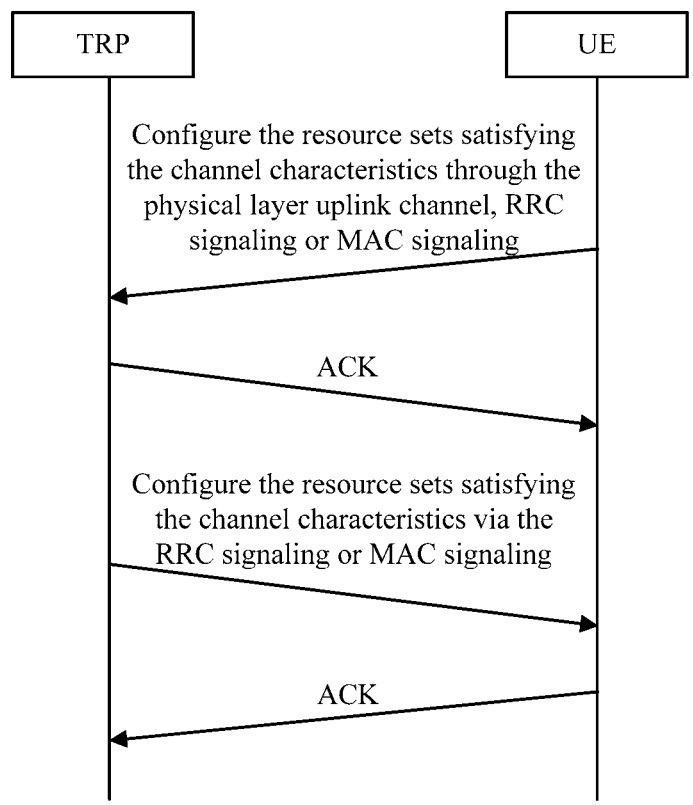
FIG. 15 is a schematic diagram showing that a UE and a TRP jointly configure resource sets conforming to a channel characteristic according to an embodiment.

FIG. 15 is a schematic diagram showing that a UE and a TRP jointly configure a resource set satisfying a channel characteristic according to this embodiment. As shown in FIG. 15, according to a measurement result of channel and beam-related information, the UE configures the resource set satisfying the channel characteristic through the physical layer uplink channel (such as the PUCCH and the PUSCH), RRC signaling or MAC signaling, and the TRP feeds back whether the resource set configuration information is successfully received through information similar to ACK information. However, the TRP may configure, according to its own beam transmission capability, the number of UEs served by the TRP, a scheduling configuration and the like, the resource sets satisfying the channel characteristic via the RRC or MAC signaling for the subsequent scheduling and configuration. It may be considered that the UE provides basic reference information (since the UE may observe the characteristics of the UE itself (such as a receiver characteristic, its own capability, and an angle of arrival)), and the TRP configures the resource sets for the subsequent operation and scheduling.

Figure 16:
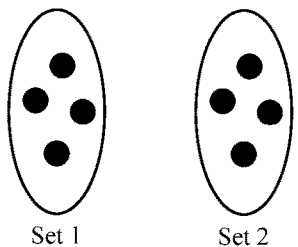
FIG. 16 is a schematic diagram of a resource indication based on resource sets jointly configured by a UE and a TRP according to an embodiment.
Figure 16:
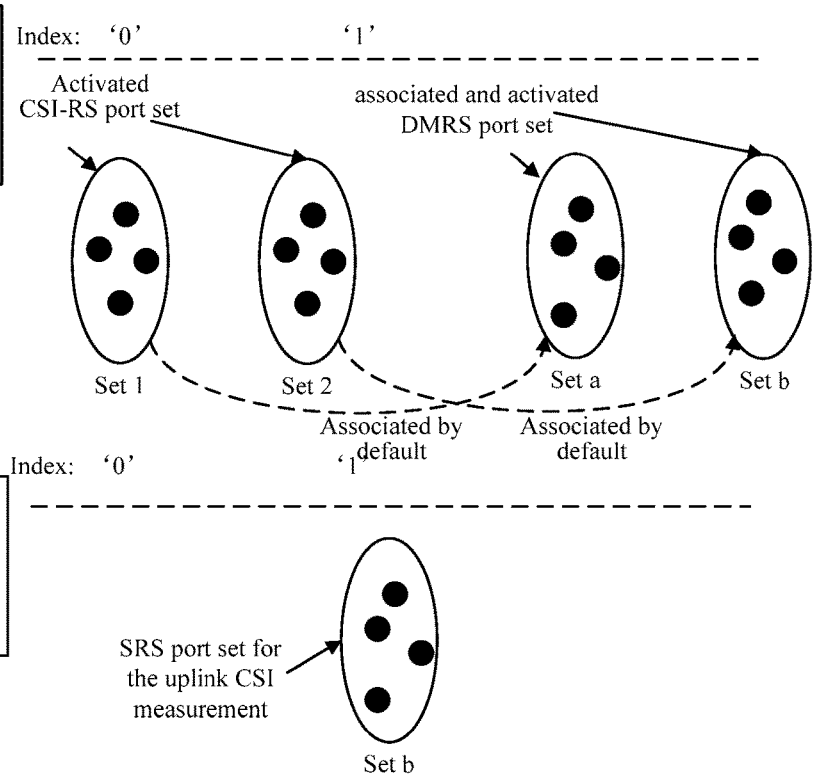

FIG. 16 is a schematic diagram of a resource indication based on resource sets jointly configured by a UE and a TRP according to this embodiment. As shown in FIG. 16, the TRP approves the configuration of the UE according to feedback information of the UE, or the TRP configures and encodes the CSI-RS port sets satisfying their respective channel characteristics under the resource sets according to the feedback information of the UE, the CSI-RS port sets includes sets 1 and 2. The UE is notified of a configuration and confirmation process of the TRP via the RRC or MAC-CE signaling. The TRP sends the MAC-CE or DCI signaling including the numbers 0 and 1 to the UE so that the SRS port sets a and b are respectively associated with the activated CSI-RS port sets 1 and 2 by a default or predefined method, that is, explicit signaling is not required. The TRP sends the DCI signaling including the number 1 of the activated set to the UE to indicate that the associated SRS port set b is used for the subsequent uplink CSI measurement.

Figure 17:
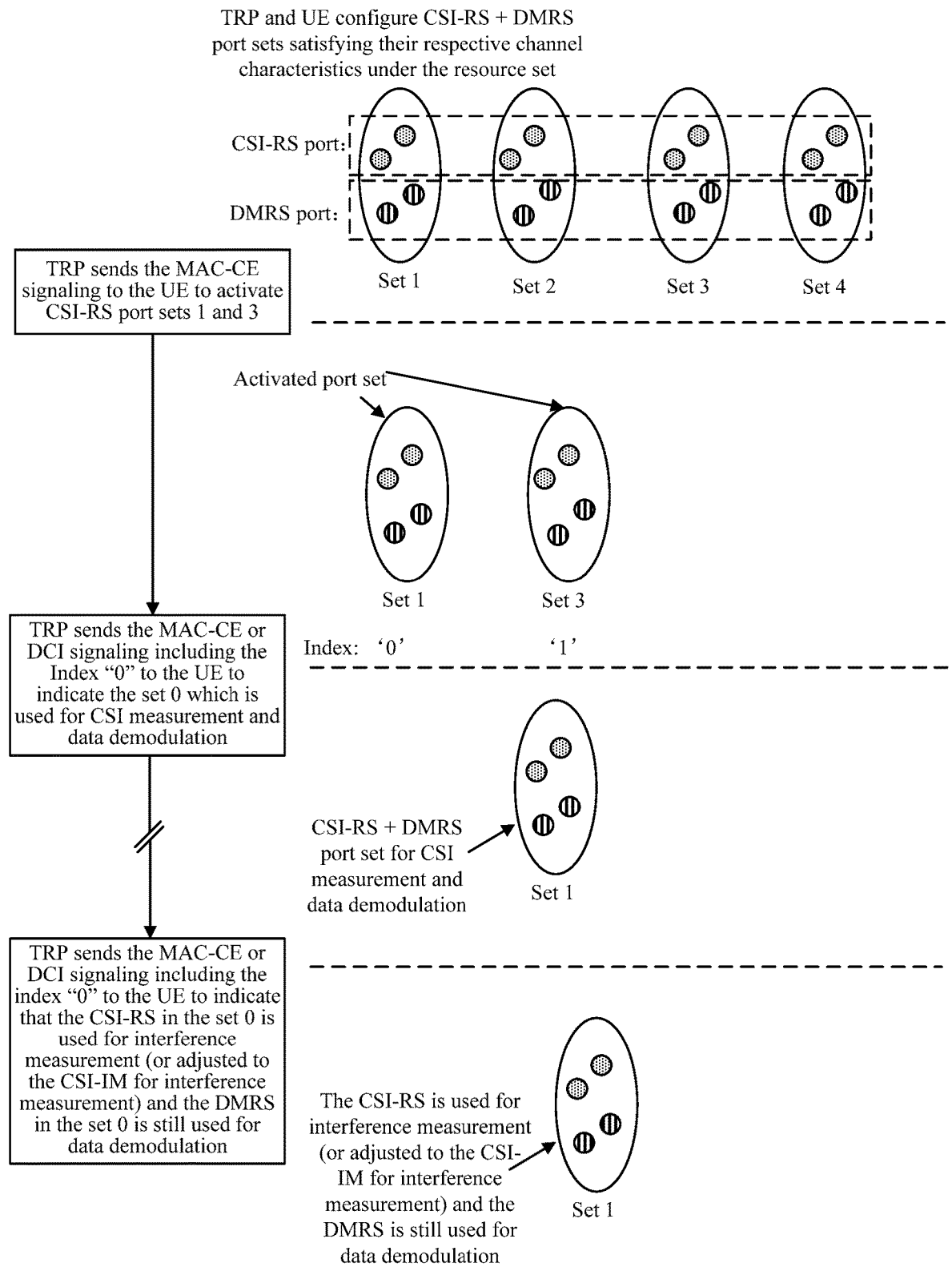
FIG. 17 is a schematic diagram of resource activation and indication based on resource sets jointly configured by a UE and a TRP according to an embodiment.

FIG. 17 is a schematic diagram of resource activation and indication based on resource sets jointly configured by a UE and a TRP according to this embodiment. As shown in FIG. 17, according to feedback of the UE, the TRP configures CSI-RS port+DMRS port sets satisfying their respective channel characteristics from the resource sets. That is, each set includes CSI-RS ports and DMRS ports satisfying the channel characteristic requirement (e.g., QCL). The TRP sends the MAC-CE signaling to the UE to activate CSI-RS port sets 1 and 3, and then the TRP sends the MAC-CE or DCI signaling including the number 0 to the UE to indicate that a set 0 is used for CSI measurement and data demodulation. After a period of time, the TRP sends the MAC-CE or DCI signaling including the number 0 to the UE to indicate that the CSI-RS in the set 0 is used for interference measurement (or adjusted to the CSI-IM for interference measurement) and the DMRS in the set 0 is still used for data demodulation.

Figure 18:
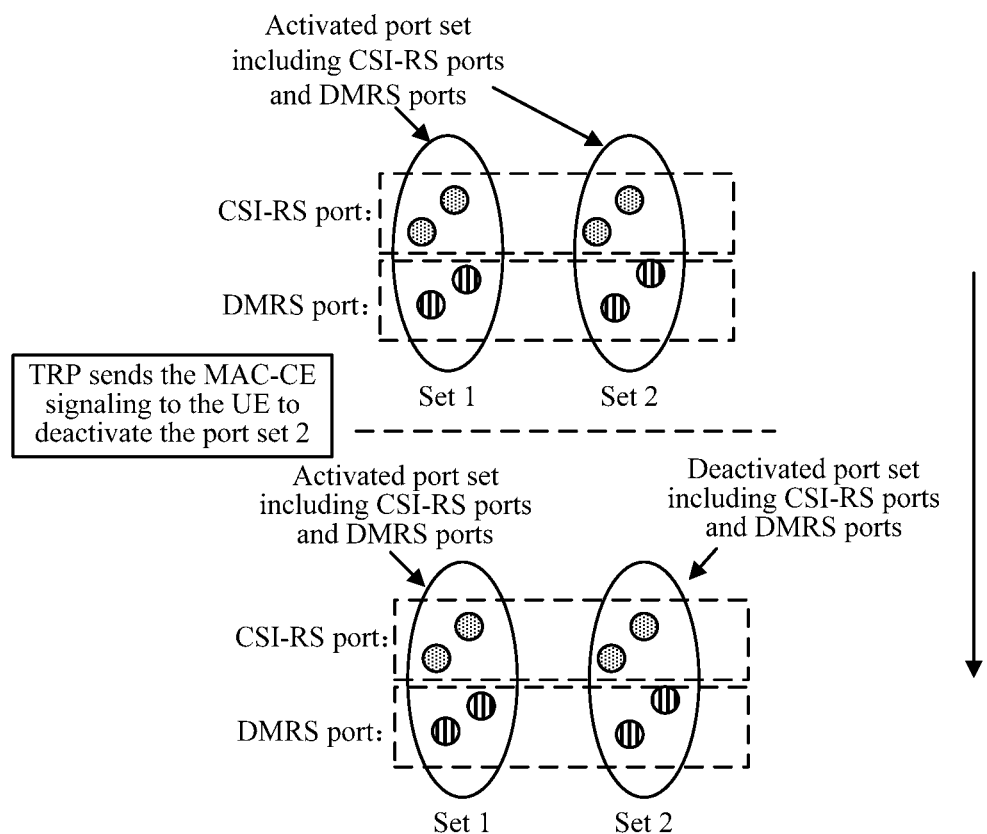
FIG. 18 is a schematic diagram of resource deactivation based on resource sets jointly configured by a UE and a TRP according to an embodiment.

FIG. 18 is a schematic diagram of resource deactivation based on resource sets jointly configured by a UE and a TRP according to this embodiment. As shown in FIG. 18, if the activated port sets include the CSI-RS ports and the DMRS ports, the TRP sends the MAC-CE signaling to the UE to deactivate a port set 2. Therefore, a set 1 still remains activated, and the set 2 is deactivated and cannot be instructed via DCI.

Figure 19:
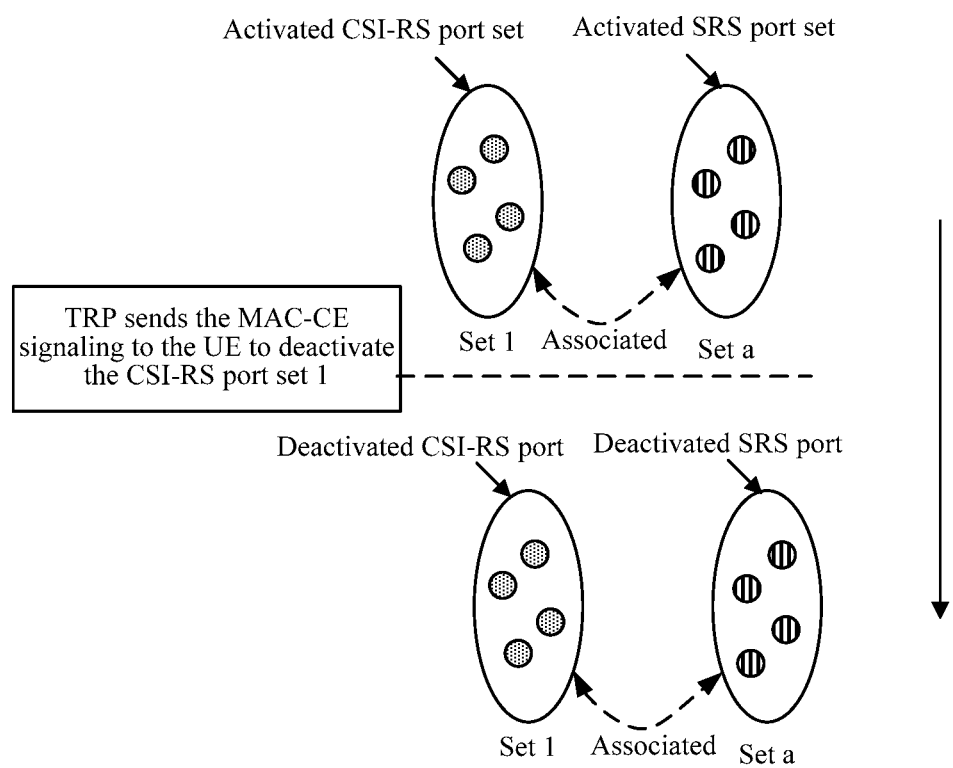
FIG. 19 is a schematic diagram of resource deactivation based on resource sets jointly configured by a UE and a TRP according to an embodiment.

FIG. 19 is another schematic diagram of resource deactivation based on resource sets jointly configured by a UE and a TRP according to this embodiment. As shown in FIG. 19, if the activated CSI-RS port set is associated with the activated SRS port set, it means that the two sets share some specific channel characteristic requirements. The TRP sends the MAC-CE signaling to the UE to deactivate the CSI-RS port set 1, and the CSI-RS port set 1 and the SRS port set a are deactivated together.

Figure 20:
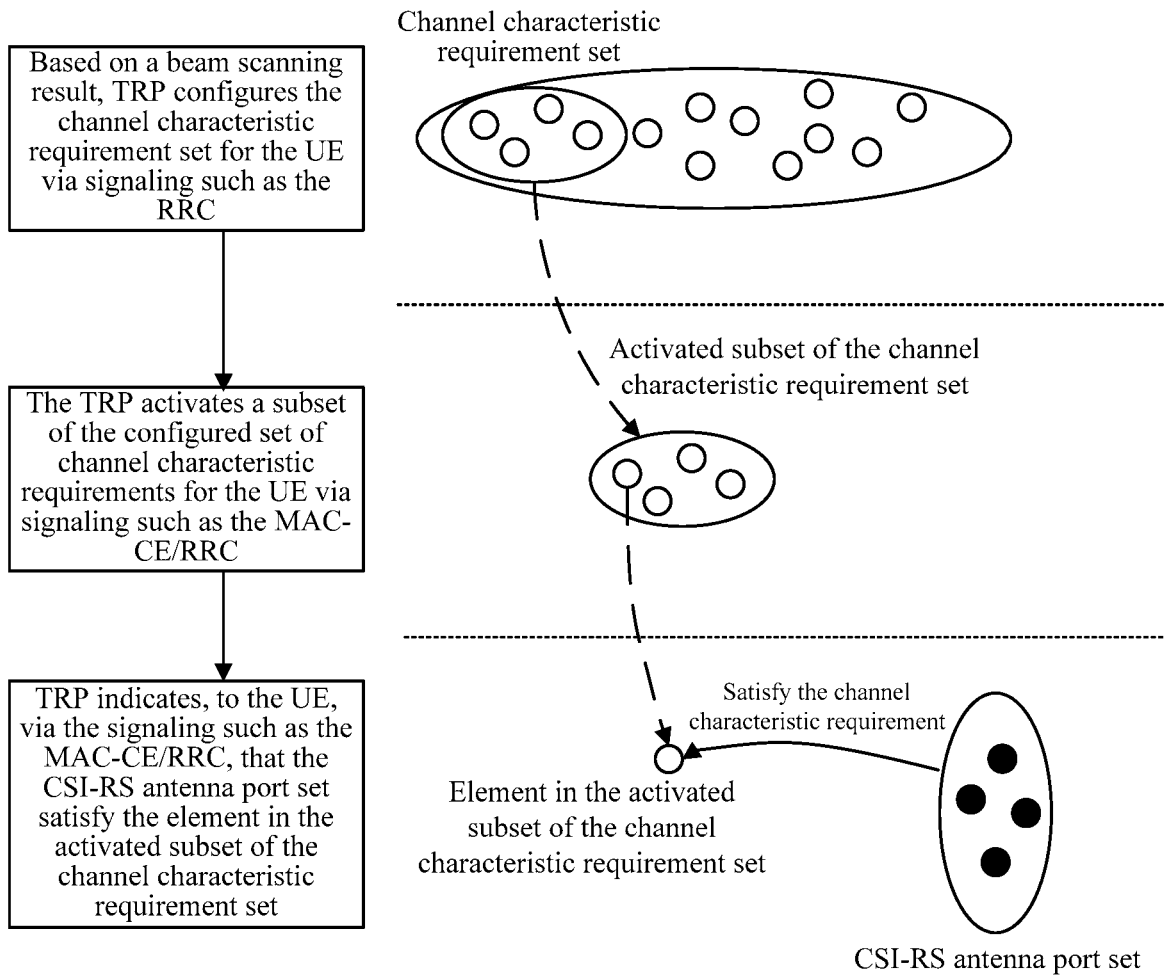
FIG. 20 is a schematic diagram of a configuration of a multi-layer channel characteristic requirement according to an embodiment.

FIG. 20 is a schematic diagram of a configuration of a multi-layer channel characteristic requirement according to this embodiment. As shown in FIG. 20, based on a beam scanning result, the TRP classifies channel characteristic requirements, configures a channel characteristic requirement set and notifies the UE of the set through an RRC channel. According to a scheduling requirement, the TRP sends the MAC-CE or RRC signaling to the UE to activate subsets of the configured channel characteristic requirement set and re-encodes and marks the subsets. When a receiving mode and/or a receiving mode of the UE need to be indicated through the channel characteristic, an antenna port set (such as the CSI-RS antenna port set) is configured via the MAC-CE or RRC signaling. The antenna port set follows a channel characteristic represented by elements in the activated subset of the channel characteristics requirement set.

In this embodiment, the first communication node may send an instruction to the second communication node to configure at least one of the reference signal, the time-frequency code resource index of the reference signal or the antenna port as one or more resource sets. The elements in the resource sets satisfy the channel characteristic requirement, such as the QCL relationship. The resource sets are maintained, updated and indicated through the multi-layer architecture, thereby implementing beam indications and beam management. No global beam index is used for indication, and antenna ports under the same reference signal or beam associations under different reference signals may be flexibly extended or revised; on the other hand, based on the set whose elements share the channel characteristic, the transceiver system may flexibly obtain diversity and multiplexing gains.

From the description of the embodiments described above, it will be apparent to those skilled in the art that the methods in the embodiments described above may be implemented by software plus a necessary general-purpose hardware platform, or may of course be implemented by hardware. The content provided by this embodiment may be embodied in the form of a software product. The computer software product is stored in a storage medium (such as a read only memory (ROM)/random access memory (RAM), a magnetic disk or an optical disk) and includes several instructions for enabling terminal equipment (which may be a mobile phone, a computer, a server, network equipment or the like) to execute the method according to any embodiment.

Embodiment 2

This embodiment further provides a signaling sending device and a signaling receiving device. The devices are used for implementing the above-mentioned embodiments and preferred embodiments. What has been described will not be repeated. As used below, the term "module" may be software, hardware or a combination thereof capable of implementing predetermined functions. The devices described below in the embodiment may be implemented by software, but implementation by hardware or by a combination of software and hardware is also possible and conceived.

Figure 21:
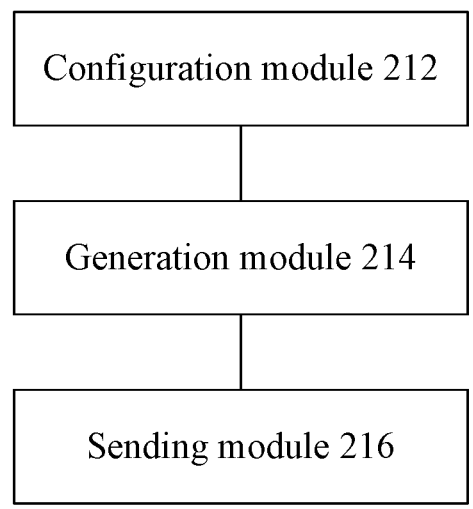
FIG. 21 is a block diagram of a signaling sending device according to an embodiment.

FIG. 21 is a block diagram of a signaling sending device according to this embodiment. As shown in FIG. 21, the device includes a configuration module 212, a generation module 214 and a sending module 216.

The configuration module 212 is configured to configure N sets according to reference-signal-related information satisfying a predetermined channel characteristic requirement, where N is an integer greater than or equal to 1.

The generating module 214 is connected to the configuration module 212 and configured to generate a first type of signaling, where the first type of signaling carries the N sets.

The sending module 216 is connected to the generation module 214 and configured to send the first type of signaling to a second communication node, where the first type of signaling is used for notifying the second communication node to perform beam indication according to the N sets.

In an exemplary embodiment, the reference-signal-related information includes at least one of a beam index, a same reference signal or different reference signals, a same reference signal index or different reference signal indexes, or a same reference signal antenna port or different reference signal antenna ports, where the reference signal index includes an explicit reference signal index or an implicit reference signal index.

In an exemplary embodiment, the predetermined channel characteristic requirement includes at least one of: elements within each of the N sets have a same channel characteristic, or channel characteristics of the elements within each of the N sets satisfy a predetermined constraint.

In an exemplary embodiment, the channel characteristic includes one of: quasi-co-location (QCL), a quasi-co-located beam, a reference signal received power, a horizontal transmission azimuth, a vertical transmission azimuth, a horizontal reception azimuth, a vertical reception azimuth, average arrival time, cluster arrival time, a correlation coefficient of time domain channel responses, a correlation coefficient of frequency domain channel responses or a spatial correlation coefficient.

In an exemplary embodiment, the beam includes at least one of a transmit beam or a receive beam.

In an exemplary embodiment, the first type of signaling is further used for notifying the second communication node to perform, according to the N sets, at least one of: indicating a transmission node of the second communication node, where the transmission node includes at least one of a serving transmission node or an interfering service node; or indicating a cell of the second communication node, where the cell includes at least one of a serving cell or an interfering cell.

In an exemplary embodiment, the N sets include at least one of a data set or an interfering set.

In an exemplary embodiment, after sending the first type of signaling to the second communication node, the sending module is further configured to reconfigure the N sets; and send a second type of signaling to the second communication node, where the second type of signaling carries the reconfigured N sets.

In an exemplary embodiment, reconfiguring the N sets includes at least one of: adding a set to the N sets; deleting an indicated set in the N sets; updating an element within the indicated set in the N sets; or deleting an element within the indicated set in the N sets.

In an exemplary embodiment, after sending the first type of signaling to the second communication node, the sending module is further configured to send a third type of signaling to the second communication node, where the third type of signaling carries information for associating Q sets with Y sets or information for associating the Q sets with elements in the Y sets or information for associating elements in the Q sets with the elements in the Y sets; receive a fourth type of signaling sent by the second communication node, where the fourth type of signaling carries the information for associating the Q sets with the Y sets or the information for associating the Q sets with the elements in the Y sets or the information for associating the elements in the Q sets with the elements in the Y sets; or associate the Q sets with the Y sets or associate the Q sets with the elements in the Y sets or associate the elements in the Q sets with the elements in the Y sets according to a predetermined rule; where Q and Y are integers greater than or equal to 1.

In an exemplary embodiment, the predetermined rule includes at least one of the following: indexes of multiple sets are within a constraint range or satisfy a specific function relationship; feedback or notification times of multiple sets are within a constraint range; or when a first type of set is configured, a second type of set is associated with a resource type of the first type of set in a default or predefined manner.

In an exemplary embodiment, an element in the associated sets satisfies the predetermined channel characteristic requirement.

In an exemplary embodiment, operations related to the associated sets include at least one of: activating part of the associated sets; deactivating part of the associated sets; indicating part of the associated sets; or indicating an element in part of the associated sets.

In an exemplary embodiment, after sending the second type of signaling to the second communication node, the sending module is further configured to activate or deactivate K sets; and send a fifth type of signaling to the second communication node, where the fifth type of signaling carries the K sets, the K sets belong to at least one of: the N sets or the reconfigured N sets, where K is an integer greater than or equal to 1.

In an exemplary embodiment, activating the K sets includes at least one of: activating the K sets for activated channel measurement sets; activating the K sets for activated demodulation sets; or activating the K sets for activated interfering sets.

In an exemplary embodiment, deactivating the K sets includes at least one of: deactivating the K sets for deactivated channel measurement sets; deactivating the K sets for deactivated demodulation sets; or deactivating the K sets for deactivated interfering sets.

In an exemplary embodiment, before the fifth type of signaling is sent to the second communication node, at least one of the following is included: sets are numbered; elements in the sets are numbered; the sets are grouped and each group is numbered; the elements in the sets are grouped and each group is numbered; the activated K sets are numbered; at least one element in the activated K sets is numbered; the activated K sets are grouped and each group is numbered; or elements in the activated K sets are grouped and each group is numbered.

In an exemplary embodiment, after sending the fifth type of signaling to the second communication node, the sending module is further configured to send a sixth type of signaling to the second communication node, where the sixth type of signaling carries a set of numbers indicating time-frequency code resource transmissions or an element in the set or an activated set or an element in the activated set; or receive a seventh type of signaling sent by the second communication node, where the seventh type of signaling carries the set of numbers indicating time-frequency code resource transmissions or the element in the set or the activated set or the element in the activated set.

In an exemplary embodiment, the numbers are transmitted through at least one of: a time-frequency code resource carrying index-associated information, an explicitly outputted index value, or joint encoding of the time-frequency code resource carrying the index-associated information and an explicitly outputted correlation value.

In an exemplary embodiment, the number of bits occupied by the sixth type of signaling is acquired according to the number of activated sets or the number of elements in the activated set.

In an exemplary embodiment, the number of bits occupied by the seventh type of signaling is acquired according to the number of activated sets or the number of elements in the activated set.

In an exemplary embodiment, the time-frequency code resource includes at least one of: one or more types of reference signal and a time-frequency code resource corresponding to one or more types of reference signal; a time-frequency code resource in a control channel; or a time-frequency code resource in a data channel.

In an exemplary embodiment, the sixth type of signaling indicates first candidate sets or elements to enable the second communication node to detect a used set or element from the first candidate sets or elements.

In an exemplary embodiment, the seventh type of signaling indicates second candidate sets or elements to for detecting the used set or element from the second candidate sets or elements.

In an exemplary embodiment, the sixth type of signaling or the seventh type of signaling is further used for at least one of: indicating a predetermined set for a channel measurement resource; indicating a predetermined set for a demodulation resource; indicating a predetermined set for an interference measurement resource; indicating an element in a predetermined set for the channel measurement resource; indicating an element in a predetermined set for the demodulation resource; or indicating an element in a predetermined set for the interference measurement resource.

In an exemplary embodiment, before configuring the N sets according to the reference-signal-related information satisfying the predetermined channel characteristic requirement, the configuration module is further configured to send an eighth type of signaling to the second communication node, where the eighth type of signaling carries a configured set of channel characteristic requirements; or receive a ninth type of signaling sent by the second communication node, where the ninth type of signaling is used for indicating the configured set of channel characteristic requirements.

In an exemplary embodiment, the predetermined channel characteristic requirement is an element in the set of channel characteristic requirements.

In an exemplary embodiment, before configuring the N sets according to the reference-signal-related information satisfying the predetermined channel characteristic requirement, the configuration module is further configured to send a tenth type of signaling to the second communication node, where the tenth type of signaling carries a subset of an activated set of channel characteristic requirements; or receive an eleventh type of signaling sent by the second communication node, where the eleventh type of signaling is used for indicating the activated subset of the set of channel characteristic requirements.

In an exemplary embodiment, the predetermined channel characteristic requirement is an element in the subset of the set of channel characteristic requirements.

In an exemplary embodiment, the first type of signaling, the second type of signaling, the third type of signaling and the fourth type of signaling are configured as the first type of set, and the fifth type of signaling and the sixth type of signaling are configured as the second type of set, where the second type of set is a subset of the first type of set. The seventh type of signaling and the eighth type of signaling are a set selected from the second type of set or an element in the set selected from the second type of set.

In an exemplary embodiment, antenna ports of the first communication node satisfy the predetermined channel characteristic requirement; or antenna ports of the second communication node satisfy the predetermined channel characteristic requirement; or the antenna port of the first communication node and the antenna port of the second communication node satisfy the predetermined channel characteristic requirement.

Figure 22:
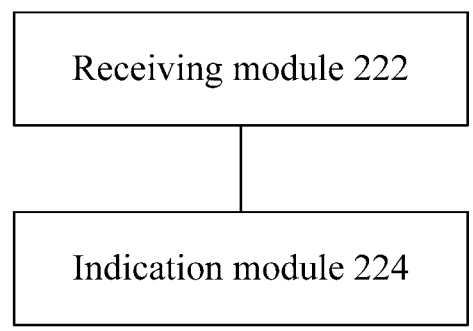
FIG. 22 is a block diagram of a signaling receiving device according to an embodiment.

In an exemplary embodiment, the channel characteristic requirement is a channel characteristic requirement whether a hard decision of which is satisfied or not or a channel characteristic requirement whether a soft decision of which is satisfied or not. FIG. 22 is a block diagram of a signaling receiving device according to this embodiment. As shown in FIG. 22, the device includes a receiving module 222 and an indication module 224.

The receiving module 222 is configured to receive a first type of signaling sent by a second communication node, where the first type of signaling carries N sets configured according to reference-signal-related information satisfying a predetermined channel characteristic requirement, where N is an integer greater than or equal to 1.

The indication module 224 is connected to the receiving module 222 and configured to perform beam indication according to the N sets.

In an exemplary embodiment, the reference-signal-related information includes at least one of a beam index, a same reference signal or different reference signals, a same reference signal index or different reference signal indexes, or a same reference signal antenna port or different reference signal antenna ports, where the reference signal index includes an explicit reference signal index or an implicit reference signal index.

In an exemplary embodiment, the predetermined channel characteristic requirement includes at least one of: elements within each of the N sets have a same channel characteristic or channel characteristics of the elements within each of the N sets satisfy a predetermined constraint.

In an exemplary embodiment, the channel characteristic includes one of: quasi-co-location (QCL), a quasi-co-located beam, a reference signal received power, a horizontal transmission azimuth, a vertical transmission azimuth, a horizontal reception azimuth, a vertical reception azimuth, average arrival time, cluster arrival time, a correlation coefficient of time domain channel responses, a correlation coefficient of frequency domain channel responses or a spatial correlation coefficient.

In an exemplary embodiment, the beam includes at least one of a transmit beam or a receive beam.

In an exemplary embodiment, the N sets are further used for at least one of: indicating a transmission node, where the transmission node includes at least one of a serving transmission node or an interfering service node; or indicating a cell, where the cell includes at least one of a serving cell or an interfering cell.

In an exemplary embodiment, the N sets include at least one of a data set or an interfering set.

In an exemplary embodiment, after receiving the first type of signaling sent by the second communication node, the receiving module is further configured to receive a second type of signaling sent by the second communication node, where the second type of signaling carries sets by reconfiguring the N sets.

In an exemplary embodiment, after receiving the first type of signaling sent by the second communication node, the receiving module is further configured to reconfigure the N sets; and send a third type of signaling to the second communication node, where the third type of signaling carries the reconfigured N sets.

In an exemplary embodiment, reconfiguring the N sets includes at least one of: adding a set to the N sets; deleting an indicated set in the N sets; updating an element within the indicated set in the N sets; or deleting an element within the indicated set in the N sets.

In an exemplary embodiment, after sending the third type of signaling to the second communication node, the receiving module is further configured to send a fourth type of signaling to the second communication node, where the fourth type of signaling carries information for associating Q sets with Y sets or information for associating the Q sets with elements in the Y sets or information for associating elements in the Q sets with elements in the Y sets; receive a fifth type of signaling sent by the second communication node, where the fifth type of signaling carries the information for associating the Q sets with the Y sets or the information for associating the Q sets with the elements in the Y sets or the information for associating the elements in the Q sets with the elements in the Y sets; and associate the Q sets with the Y sets or associate the Q sets with the elements in the Y sets or associate the elements in the Q sets with the elements in the Y sets according to a predetermined rule; where Q and Y are integers greater than or equal to 1.

In an exemplary embodiment, the predetermined rule includes at least one of the following: indexes of multiple sets are within a constraint range or satisfy a specific function relationship; feedback or notification times of multiple sets are within a constraint range; or when a first type of set is configured, a second type of set is associated with a resource type of the first type of set in a default or predefined manner.

In an exemplary embodiment, elements in the associated sets satisfy the predetermined channel characteristic requirement.

In an exemplary embodiment, operations related to the associated sets include at least one of: activating part of the associated sets; deactivating part of the associated sets; indicating part of the associated sets; or indicating an element in part of the associated sets.

In an exemplary embodiment, after sending the third type of signaling to the second communication node, the receiving module is further configured to activate or deactivate K sets; and send a sixth type of signaling to the second communication node, where the sixth type of signaling carries the K sets, the K sets belong to at least one of: the N sets or the reconfigured N sets, where K is an integer greater than or equal to 1.

In an exemplary embodiment, activating the K sets includes at least one of: activating the K sets for activated channel measurement sets; activating the K sets for activated demodulation sets; or activating the K sets for activated interfering sets.

In an exemplary embodiment, deactivating the K sets includes at least one of: deactivating the K sets for deactivated channel measurement sets; deactivating the K sets for deactivated demodulation sets; or deactivating the K sets for deactivated interfering sets.

In an exemplary embodiment, before sending the sixth type of signaling to the second communication node, the receiving module is further configured to number sets and/or elements in the sets; group the sets and/or the elements in the sets and number each group; number activated sets and/or elements in the activated sets; and group the activated sets and/or the elements in the activated sets and number each group.

In an exemplary embodiment, after sending the sixth type of signaling to the second communication node, the receiving module is further configured to send a seventh type of signaling to the second communication node, where the seventh type of signaling carries a set of numbers indicating time-frequency code resource transmissions or an element in the set or an activated set or an element in the activated set; and receive an eighth type of signaling sent by the second communication node, where the eighth type of signaling carries the set of numbers indicating time-frequency code resource transmissions or the element in the set or the activated set or the element in the activated set.

In an exemplary embodiment, the numbers are transmitted through at least one of: a time-frequency code resource carrying index-associated information, an explicitly outputted index value, or joint encoding of the time-frequency code resource carrying the index-associated information and an explicitly outputted correlation value.

In an exemplary embodiment, a number of bits occupied by the seventh type of signaling is acquired according to a number of activated sets or a number of elements in the activated set.

In an exemplary embodiment, a number of bits occupied by the eighth type of signaling is acquired according to the number of activated sets or the number of elements in the activated set.

In an exemplary embodiment, the time-frequency code resource includes at least one of: one or more types of reference signal and a time-frequency code resource corresponding to the one or more types of reference signal; a time-frequency code resource in a control channel; or a time-frequency code resource in a data channel.

In an exemplary embodiment, the seventh type of signaling indicates first candidate sets or elements to enable the second communication node to detect a used set or element from the first candidate sets or elements.

In an exemplary embodiment, the eighth type of signaling indicates second candidate sets or elements to enable detection of the used set or element from the second candidate sets or elements.

In an exemplary embodiment, the seventh type of signaling or the eighth type of signaling is further used for at least one of: indicating a predetermined set for a channel measurement resource; indicating a predetermined set for a demodulation resource; indicating a predetermined set for an interference measurement resource; indicating an element in a predetermined set for the channel measurement resource; indicating an element in a predetermined set for the demodulation resource; or indicating an element in a predetermined set for the interference measurement resource.

In an exemplary embodiment, before receiving the first type of signaling sent by the second communication node, the receiving module is further configured to send a ninth type of signaling to the second communication node, where the ninth type of signaling carries a configured set of channel characteristic requirements; or receive a tenth type of signaling sent by the second communication node, where the tenth type of signaling is used for indicating the configured set of channel characteristic requirements.

In an exemplary embodiment, the predetermined channel characteristic requirement is an element in the set of channel characteristic requirements.

In an exemplary embodiment, before receiving the first type of signaling sent by the second communication node, the receiving module is further configured to send an eleventh type of signaling to the second communication node, where the eleventh type of signaling carries an activated subset of the set of channel characteristic requirements; or receive a twelfth type of signaling sent by the second communication node, where the twelfth type of signaling is used for indicating the activated subset of the set of channel characteristic requirements.

In an exemplary embodiment, the predetermined channel characteristic requirement is an element in the subset of the set of channel characteristic requirements.

In an exemplary embodiment, the first type of signaling, the second type of signaling, the third type of signaling and the fourth type of signaling are configured as the first type of set, and the fifth type of signaling and the sixth type of signaling are configured as the second type of set. The second type of set is a subset of the first type of set. The seventh type of signaling and the eighth type of signaling are a set selected from the second type of set or an element in the set selected from the second type of set.

In an exemplary embodiment, antenna ports of the first communication node satisfy the predetermined channel characteristic requirement; or antenna ports of the second communication node satisfy the predetermined channel characteristic requirement; or the antenna port of the first communication node and the antenna port of the second communication node satisfy the predetermined channel characteristic requirement.

In an exemplary embodiment, the channel characteristic requirement a channel characteristic requirement determined according to whether its hard decision is satisfied or not, or a channel characteristic requirement determined according to whether its soft decision is satisfied or not.

One or more modules described above may be implemented by software or hardware. Implementation by hardware may, but may not necessarily, be implemented in the following manner: the one or more modules described above are located in a same processor or the multiple modules may be located in their respective processors in any combination form.

Embodiment 3

This embodiment further provides a storage medium. In an exemplary embodiment, in this embodiment, the storage medium may be configured to store program codes for performing steps described below.

In S1, N sets are configured according to reference-signal-related information satisfying a predetermined channel characteristic requirement, where N is an integer greater than or equal to 1.

In S2, a first type of signaling is generated, where the first type of signaling carries the N sets.

In S3, the first type of signaling is sent to a second communication node, where the first type of signaling is used for notifying the second communication node to perform beam indication according to the N sets.

In an exemplary embodiment, the storage medium is further configured to store program codes for executing a step described below.

In S1, the reference-signal-related information includes at least one of a beam index, a same reference signal or different reference signals, a same reference signal index or different reference signal indexes, or a same reference signal antenna port or different reference signal antenna ports, where the reference signal index includes an explicit reference signal index or an implicit reference signal index.

In an exemplary embodiment, the storage medium is further configured to store program codes for executing a step described below.

In S1, the predetermined channel characteristic requirement includes at least one of: elements within each of the N sets having a same channel characteristic or channel characteristics of the elements within each of the N sets satisfying a predetermined constraint.

In an exemplary embodiment, the storage medium is further configured to store program codes for executing a step described below.

In S1, the channel characteristic includes one of: quasi-co-location (QCL), a quasi-co-located beam, a reference signal received power, a horizontal transmission azimuth, a vertical transmission azimuth, a horizontal reception azimuth, a vertical reception azimuth, average arrival time, cluster arrival time, a correlation coefficient of time domain channel responses, a correlation coefficient of frequency domain channel responses, or a spatial correlation coefficient.

In an exemplary embodiment, the storage medium is further configured to store program codes for executing a step described below.

In S1, the beam includes at least one of a transmit beam or a receive beam.

In an exemplary embodiment, the storage medium is further configured to store program codes for executing a step described below.

In S1, the first type of signaling is further used for notifying the second communication node to perform, according to the N sets, at least one of:

indicating a transmission node of the second communication node, where the transmission node includes at least one of a serving transmission node or an interfering service node; or indicating a cell of the second communication node, where the cell includes at least one of a serving cell or an interfering cell.

In an exemplary embodiment, the storage medium is further configured to store program codes for executing a step described below.

In S1, the N sets include at least one of a data set or an interfering set.

In an exemplary embodiment, the storage medium is further configured to store program codes for executing a step described below.

In S1, after the first type of signaling is sent to the second communication node, a method further includes:
reconfiguring N sets; and
sending a second type of signaling to the second communication node, where the second type of signaling carries the reconfigured N sets.

In an exemplary embodiment, the storage medium is further configured to store program codes for executing a step described below.

In S1, reconfiguring the N sets includes at least one of:
adding a set to the N sets;
deleting an indicated set in the N sets;
updating an element within the indicated set in the N sets; or
deleting an element within the indicated set in the N sets.

In an exemplary embodiment, the storage medium is further configured to store program codes for executing a step described below.

In S1, after the second type of signaling is sent to the second communication node, the method further includes at least one of:
sending a third type of signaling to the second communication node, where the third type of signaling carries information for associating Q sets with Y sets or information for associating the Q sets with elements in the Y sets or information for associating elements in the Q sets with the elements in the Y sets;
receiving a fourth type of signaling sent by the second communication node, where the fourth type of signaling carries the information for associating the Q sets with the Y sets or the information for associating the Q sets with the elements in the Y sets or the information for associating the elements in the Q sets with the elements in the Y sets; or
associating the Q sets with the Y sets or associating the Q sets with the elements in the Y sets or associating the elements in the Q sets with the elements in the Y sets according to a predetermined rule; where Q and Y are integers greater than or equal to 1.

In an exemplary embodiment, the storage medium is further configured to store program codes for executing a step described below.

In S1, the predetermined rule includes at least one of the following:
indexes of multiple sets are within a constraint range or satisfy a specific function relationship;
feedback or notification times of multiple sets are within a constraint range; or
when a first type of set is configured, a second type of set is associated with a resource type of the first type of set in a default or predefined manner.

In an exemplary embodiment, the storage medium is further configured to store program codes for executing a step described below.

In S1, elements in the associated sets satisfy the predetermined channel characteristic requirement.

In an exemplary embodiment, the storage medium is further configured to store program codes for executing a step described below.

In S1, operations related to the associated sets include at least one of:
activating part of the associated sets;
deactivating part of the associated sets;
indicating part of the associated sets; or
indicating an element in part of the associated sets.

In an exemplary embodiment, the storage medium is further configured to store program codes for executing a step described below.

In S1, after the second type of signaling is sent to the second communication node, the method further includes
activating or deactivating K sets; and
sending a fifth type of signaling to the second communication node, where the fifth type of signaling carries the K sets, the K sets belong to at least one of: the N sets or the reconfigured N sets, and K is an integer greater than or equal to 1.

In an exemplary embodiment, the storage medium is further configured to store program codes for executing a step described below.

In S1, activating the K sets includes at least one of:
activating the K sets for activated channel measurement sets;
activating the K sets for activated demodulation sets; or
activating the K sets for activated interfering sets.

In an exemplary embodiment, the storage medium is further configured to store program codes for executing a step described below.

In S1, deactivating the K sets includes at least one of:
deactivating the K sets for deactivated channel measurement sets;
deactivating the K sets for deactivated demodulation sets; or
deactivating the K sets for deactivated interfering sets.

In an exemplary embodiment, the storage medium is further configured to store program codes for executing a step described below.

In S1, before the fifth type of signaling is sent to the second communication node, at least one of the following is included:
sets are numbered; elements in the sets are numbered;
the sets are grouped and each group is numbered; the elements in the sets are grouped and each group is numbered;
the activated K sets are numbered; at least one element in the activated K sets is numbered; or
the activated K sets are grouped and each group is numbered; elements in the activated K sets are grouped and each group is numbered.

In an exemplary embodiment, the storage medium is further configured to store program codes for executing a step described below.

In S1, after the fifth type of signaling is sent to the second communication node, the method further includes
sending a sixth type of signaling to the second communication node, where the sixth type of signaling carries a set of numbers indicating time-frequency code resource transmissions or an element in the set or an activated set or an element in the activated set; and
receiving a seventh type of signaling sent by the second communication node, where the seventh type of signaling carries the set of numbers indicating time-frequency code resource transmissions or the element in the set or the activated set or the element in the activated set.

In an exemplary embodiment, the storage medium is further configured to store program codes for executing a step described below.

In S1, the numbers are transmitted through at least one of: a time-frequency code resource carrying index-associated information, an explicitly outputted index value, or joint encoding of the time-frequency code resource carrying the index-associated information and an explicitly outputted correlation value.

In an exemplary embodiment, the storage medium is further configured to store program codes for executing a step described below.

In S1, the number of bits occupied by the sixth type of signaling is acquired according to the number of activated sets or the number of elements in the activated set.

In an exemplary embodiment, the storage medium is further configured to store program codes for executing a step described below.

In S1, the number of bits occupied by the seventh type of signaling is acquired according to the number of activated sets or the number of elements in the activated set.

In an exemplary embodiment, the storage medium is further configured to store program codes for executing a step described below.

In S1, the time-frequency code resource includes at least one of:

one or more types of reference signal and a time-frequency code resource corresponding to the one or more types of reference signal;

a time-frequency code resource in a control channel; or a time-frequency code resource in a data channel.

In an exemplary embodiment, the storage medium is further configured to store program codes for executing a step described below.

In S1, the sixth type of signaling indicates first candidate sets or elements to enable the second communication node to detect a used set or element from the first candidate sets or elements.

In an exemplary embodiment, the storage medium is further configured to store program codes for executing a step described below.

In S1, the seventh type of signaling indicates second candidate sets or elements for detecting the used set or element from the second candidate sets or elements.

In an exemplary embodiment, the storage medium is further configured to store program codes for executing a step described below.

In S1, the sixth type of signaling or the seventh type of signaling is further used for at least one of:

indicating a predetermined set for a channel measurement resource;

indicating a predetermined set for a demodulation resource;

indicating a predetermined set for an interference measurement resource;

indicating an element in a predetermined set for the channel measurement resource;

indicating an element in a predetermined set for the demodulation resource; or indicating an element in a predetermined set for the interference measurement resource.

In an exemplary embodiment, the storage medium is further configured to store program codes for executing a step described below.

In S1, before the N sets are configured according to the reference-signal-related information satisfying the predetermined channel characteristic requirement, the method further includes:

sending an eighth type of signaling to the second communication node, where the eighth type of signaling carries a configured set of channel characteristic requirements; or receiving a ninth type of signaling sent by the second communication node, where the ninth type of signaling is used for indicating the configured set of channel characteristic requirements.

In an exemplary embodiment, the storage medium is further configured to store program codes for executing a step described below.

In S1, the predetermined channel characteristic requirement is an element in the set of channel characteristic requirements.

In an exemplary embodiment, the storage medium is further configured to store program codes for executing a step described below.

In S1, before the N sets are configured according to the reference-signal-related information satisfying the predetermined channel characteristic requirement, the method further includes:

sending a tenth type of signaling to the second communication node, where the tenth type of signaling carries a subset of an activated set of channel characteristic requirements; or receiving an eleventh type of signaling sent by the second communication node, where the eleventh type of signaling is used for indicating the activated subset of the set of channel characteristic requirements.

In an exemplary embodiment, the storage medium is further configured to store program codes for executing a step described below.

In S1, the predetermined channel characteristic requirement is an element in the subset of the set of channel characteristic requirements.

In an exemplary embodiment, the storage medium is further configured to store program codes for executing a step described below.

In S1, the first type of signaling, the second type of signaling, the third type of signaling and the fourth type of signaling are configured as the first type of set, and the fifth type of signaling and the sixth type of signaling are configured as the second type of set, where the second type of set is a subset of the first type of set.

The seventh type of signaling and the eighth type of signaling are a set selected from the second type of set or an element in the set selected from the second type of set.

This embodiment further provides a storage medium. In an exemplary embodiment, in this embodiment, the storage medium may be configured to store program codes for performing steps described below.

In S1, a first type of signaling sent by the second communication node is received, where the first type of signaling carries N sets configured according to reference-signal-related information satisfying a predetermined channel characteristic requirement, where N is an integer greater than or equal to 1.

In S2, beam indication is performed according to the N sets.

In an exemplary embodiment, the storage medium is further configured to store program codes for executing a step described below.

In S1, the reference-signal-related information includes at least one of a beam index, a same reference signal or different reference signals, a same reference signal index or different reference signal indexes, or a same reference signal antenna port or different reference signal antenna ports, where the reference signal index includes an explicit reference signal index or an implicit reference signal index.

In an exemplary embodiment, the storage medium is further configured to store program codes for executing a step described below.

In S1, the predetermined channel characteristic requirement includes at least one of: elements within each of the N sets having a same channel characteristic or channel characteristics of the elements within each of the N sets satisfying a predetermined constraint.

In an exemplary embodiment, the storage medium is further configured to store program codes for executing a step described below.

In S1, the channel characteristic includes one of: quasi-co-location (QCL), a quasi-co-located beam, a reference signal received power, a horizontal transmission azimuth, a vertical transmission azimuth, a horizontal reception azimuth, a vertical reception azimuth, average arrival time, cluster arrival time, a correlation coefficient of time domain channel responses, a correlation coefficient of frequency domain channel responses or a spatial correlation coefficient.

In an exemplary embodiment, the storage medium is further configured to store program codes for executing a step described below.

In S1, the beam includes at least one of a transmit beam or a receive beam.

In an exemplary embodiment, the storage medium is further configured to store program codes for executing a step described below.

In S1, the N sets are further used for at least one of: indicating a transmission node, where the transmission node includes at least one of a serving transmission node or an interfering service node; or indicating a cell, where the cell includes at least one of a serving cell or an interfering cell.

In an exemplary embodiment, the storage medium is further configured to store program codes for executing a step described below.

In S1, the N sets include at least one of a data set or an interfering set.

In an exemplary embodiment, the storage medium is further configured to store program codes for executing a step described below.

In S1, after the first type of signaling sent by the second communication node is received, a method further includes receiving a second type of signaling sent by the second communication node, where the second type of signaling carries sets by reconfiguring the N sets.

In an exemplary embodiment, the storage medium is further configured to store program codes for executing a step described below.

In S1, after the first type of signaling sent by the second communication node is received, the method further includes:
reconfiguring the N sets; and
sending a third type of signaling to the second communication node, where the third type of signaling carries the reconfigured N sets.

In an exemplary embodiment, the storage medium is further configured to store program codes for executing a step described below.

In S1, reconfiguring the N sets includes at least one of:
adding a set to the N sets;
deleting an indicated set in the N sets;
updating an element within the indicated set in the N sets; or
deleting an element within the indicated set in the N sets.

In an exemplary embodiment, the storage medium is further configured to store program codes for executing a step described below.

In S1, after the third type of signaling is sent to the second communication node, the method further includes at least one of:
sending a fourth type of signaling to the second communication node, where the fourth type of signaling carries information for associating Q sets with Y sets or information for associating the Q sets with elements in the Y sets or information for associating elements in the Q sets with elements in the Y sets;
receiving a fifth type of signaling sent by the second communication node, where the fifth type of signaling carries the information for associating the Q sets with the Y sets or the information for associating the Q sets with the elements in the Y sets or the information for associating the elements in the Q sets with the elements in the Y sets; or
associating the Q sets with the Y sets or associating the Q sets with the elements in the Y sets or associating the elements in the Q sets with the elements in the Y sets according to a predetermined rule; where Q and Y are integers greater than or equal to 1.

In an exemplary embodiment, the storage medium is further configured to store program codes for executing a step described below.

In S1, the predetermined rule includes at least one of the following:
indexes of multiple sets are within a constraint range or satisfy a specific function relationship;
feedback or notification times of multiple sets are within a constraint range; or
when a first type of set is configured, a second type of set is associated with a resource type of the first type of set in a default or predefined manner.

In an exemplary embodiment, the storage medium is further configured to store program codes for executing a step described below.

In S1, elements in the associated sets satisfy the predetermined channel characteristic requirement.

In an exemplary embodiment, the storage medium is further configured to store program codes for executing a step described below.

In S1, operations related to the associated sets include at least one of:
activating part of the associated sets;
deactivating part of the associated sets;
indicating part of the associated sets; or
indicating an element in part of the associated sets.

In an exemplary embodiment, the storage medium is further configured to store program codes for executing a step described below.

In S1, after the third type of signaling is sent to the second communication node, the method further includes:
activating or deactivating K sets; and
sending a sixth type of signaling to the second communication node, where the sixth type of signaling carries the K sets, the K sets belong to at least one of: the N sets or the reconfigured N sets, where K is an integer greater than or equal to 1.

In an exemplary embodiment, the storage medium is further configured to store program codes for executing a step described below.

In S1, activating the K sets includes at least one of:
activating the K sets for activated channel measurement sets;
activating the K sets for activated demodulation sets; or
activating the K sets for activated interfering sets.

In an exemplary embodiment, the storage medium is further configured to store program codes for executing a step described below.

In S1, deactivating the K sets includes at least one of:
deactivating the K sets for deactivated channel measurement sets;
deactivating the K sets for deactivated demodulation sets; or
deactivating the K sets for deactivated interfering sets.

In an exemplary embodiment, the storage medium is further configured to store program codes for executing a step described below.

In S1, before the sixth type of signaling is sent to the second communication node, the method further includes at least one of:
numbering sets and/or elements in the sets;
grouping the sets and/or the elements in the sets and numbering each group;
numbering activated sets and/or element in the activated sets; or
grouping the activated sets and/or the elements in the activated sets and numbering each group.

In an exemplary embodiment, the storage medium is further configured to store program codes for executing a step described below.

In S1, after the sixth type of signaling is sent to the second communication node, the method further includes:
sending a seventh type of signaling to the second communication node, where the seventh type of signaling carries a set of numbers indicating time-frequency code resource transmissions or an element in the set or an activated set or an element in the activated set; and
receiving an eighth type of signaling sent by the second communication node, where the eighth type of signaling carries the set of numbers indicating time-frequency code resource transmissions or the element in the set or the activated set or the element in the activated set.

In an exemplary embodiment, the storage medium is further configured to store program codes for executing a step described below.

In S1, the numbers are transmitted through at least one of: a time-frequency code resource carrying index-associated information, an explicitly outputted index value, or joint encoding of the time-frequency code resource carrying the index-associated information and an explicitly outputted correlation value.

In an exemplary embodiment, the storage medium is further configured to store program codes for executing a step described below.

In S1, the number of bits occupied by the seventh type of signaling is acquired according to the number of activated sets or the number of elements in the activated set.

In an exemplary embodiment, the storage medium is further configured to store program codes for executing a step described below.

In S1, the number of bits occupied by the eighth type of signaling is acquired according to the number of activated sets or the number of elements in the activated set.

In an exemplary embodiment, the storage medium is further configured to store program codes for executing a step described below.

In S1, the time-frequency code resource includes at least one of:
one or more types of reference signal and a time-frequency code resource corresponding to the one or more types of reference signal;
a time-frequency code resource in a control channel; or
a time-frequency code resource in a data channel.

In an exemplary embodiment, the storage medium is further configured to store program codes for executing a step described below.

In S1, the seventh type of signaling indicates first candidate sets or elements to enable the second communication node to detect a used set or element from the first candidate sets or elements.

In an exemplary embodiment, the storage medium is further configured to store program codes for executing a step described below.

In S1, the eighth type of signaling indicates second candidate sets or elements for detecting the used set or element from the second candidate sets or elements.

In an exemplary embodiment, the storage medium is further configured to store program codes for executing a step described below.

In S1, the seventh type of signaling or the eighth type of signaling is further used for at least one of:
indicating a predetermined set for a channel measurement resource;
indicating a predetermined set for a demodulation resource;
indicating a predetermined set for an interference measurement resource;
indicating an element in a predetermined set for the channel measurement resource;
indicating an element in a predetermined set for the demodulation resource; or
indicating an element in a predetermined set for the interference measurement resource.

In an exemplary embodiment, the storage medium is further configured to store program codes for executing a step described below.

In S1, before the first type of signaling sent by the second communication node is received, the method further includes:
sending a ninth type of signaling to the second communication node, where the ninth type of signaling carries a configured set of channel characteristic requirements; or
receiving a tenth type of signaling sent by the second communication node, where the tenth type of signaling is used for indicating the configured set of channel characteristic requirements.

In an exemplary embodiment, the storage medium is further configured to store program codes for executing a step described below.

In S1, the predetermined channel characteristic requirement is an element in the set of channel characteristic requirements.

In an exemplary embodiment, the storage medium is further configured to store program codes for executing a step described below.

In S1, before the first type of signaling sent by the second communication node is received, the method further includes:
sending an eleventh type of signaling to the second communication node, where the eleventh type of signaling carries an activated subset of the set of channel characteristic requirements; or receiving a twelfth type of signaling sent by the second communication node, where the twelfth type of signaling is used for indicating the activated subset of the set of channel characteristic requirements.

In an exemplary embodiment, the storage medium is further configured to store program codes for executing a step described below.

In S1, the predetermined channel characteristic requirement is an element in the subset of the set of channel characteristic requirements.

In an exemplary embodiment, the storage medium is further configured to store program codes for executing a step described below.

In S1, the first type of signaling, the second type of signaling, the third type of signaling and the fourth type of signaling are configured as the first type of set, and the fifth type of signaling and the sixth type of signaling are configured as the second type of set, where the second type of set is a subset of the first type of set.

The seventh type of signaling and the eighth type of signaling are a set selected from the second type of set or elements in the set selected from the second type of set.

Optionally, in this embodiment, the storage medium may include, but is not limited to, a USB flash disk, a read-only memory (ROM), a random access memory (RAM), a mobile hard disk, a magnetic disk, an optical disk or another medium capable of storing program codes.

Optionally, in this embodiment, according to program codes stored in a storage medium, a processor configures N sets according to reference-signal-related information satisfying a predetermined channel characteristic requirement, where N is an integer greater than or equal to 1; generates a first type of signaling that carries the N sets; and send the first type of signaling to a second communication node, where the first type of signaling is used for notifying the second communication node to perform beam indication according to the N sets.

Optionally, in this embodiment, the processor performs, according to the program codes stored in the storage medium, the following step: the reference-signal-related information includes at least one of a beam index, a same reference signal or different reference signals, a same reference signal index or different reference signal indexes, or a same reference signal antenna port or different reference signal antenna ports, where the reference signal index includes an explicit reference signal index or an implicit reference signal index.

Optionally, in this embodiment, the processor performs, according to the program codes stored in the storage medium, the following step: the predetermined channel characteristic requirement includes at least one of: elements within each of the N sets having a same channel characteristic or channel characteristics of the elements within each of the N sets satisfying a predetermined constraint.

Optionally, in this embodiment, the processor performs, according to the program codes stored in the storage medium, the following step: the channel characteristic includes one of: quasi-co-location (QCL), a quasi-co-located beam, a reference signal received power, a horizontal transmission azimuth, a vertical transmission azimuth, a horizontal reception azimuth, a vertical reception azimuth, average arrival time, cluster arrival time, a correlation coefficient of time domain channel responses, a correlation coefficient of frequency domain channel responses or a spatial correlation coefficient.

Optionally, in this embodiment, the processor performs, according to the program codes stored in the storage medium, the following step: the beam includes at least one of a transmit beam or a receive beam.

Optionally, in this embodiment, the processor performs, according to the program codes stored in the storage medium, the following step: the first type of signaling is further used for notifying the second communication node to perform, according to the N sets, at least one of: indicating a transmission node of the second communication node, where the transmission node includes at least one of a serving transmission node or an interfering service node; or indicating a cell of the second communication node, where the cell includes at least one of a serving cell or an interfering cell.

Optionally, in this embodiment, the processor performs, according to the program codes stored in the storage medium, the following step: the N sets include at least one of a data set or an interfering set.

Optionally, in this embodiment, the steps executed by the processor according to the program codes stored in the storage medium further include: after the first type of signaling is sent to the second communication node, reconfiguring N sets; and sending a second type of signaling to the second communication node, where the second type of signaling carries the reconfigured N sets.

Optionally, in this embodiment, the processor performs, according to the program codes stored in the storage medium, the following step: reconfiguring the N sets includes at least one of: adding a set to the N sets; deleting an indicated set in the N sets; updating an element within the indicated set in the N sets; or deleting an element within the indicated set in the N sets.

Optionally, in this embodiment, after the second type of signaling is sent to the second communication node, according to the program codes stored in the storage medium, the processor further performs at least one of: sending a third type of signaling to the second communication node, where the third type of signaling carries information for associating Q sets with Y sets or information for associating the Q sets with elements in the Y sets or information for associating elements in the Q sets with elements in the Y sets; receiving a fourth type of signaling sent by the second communication node, where the fourth type of signaling carries the information for associating the Q sets with the Y sets or the information for associating the Q sets with the elements in the Y sets or the information for associating the elements in the Q sets with the elements in the Y sets; or associating the Q sets with the Y sets or associating the Q sets with the elements in the Y sets or associating the elements in the Q sets with the elements in the Y sets according to a predetermined rule; where Q and Y are integers greater than or equal to 1.

Optionally, in this embodiment, the processor performs, according to the program codes stored in the storage medium, the following step: the predetermined rule includes at least one of the following: indexes of multiple sets are within a constraint range or satisfy a specific function relationship; feedback or notification times of multiple sets are within a constraint range; or when a first type of set is configured, a second type of set is associated with a resource type of the first type of set in a default or predefined manner.

Optionally, in this embodiment, the processor performs, according to the program codes stored in the storage medium, the following step: elements in the associated sets satisfy the predetermined channel characteristic requirement.

Optionally, in this embodiment, the processor performs, according to the program codes stored in the storage medium, the following step: operations related to the associated sets include at least one of: activating part of the associated sets; deactivating part of the associated sets; indicating part of the associated sets; or indicating an element in part of the associated sets.

Optionally, in this embodiment, after the second type of signaling is sent to the second communication node, according to the program codes stored in the storage medium, the processor further performs: activating or deactivating K sets; and sending a fifth type of signaling to the second communication node, where the fifth type of signaling carries the K sets, the K sets belong to at least one of: the N sets or the reconfigured N sets, where K is an integer greater than or equal to 1.

Optionally, in this embodiment, the processor performs, according to the program codes stored in the storage medium, the following step: activating the K sets includes at least one of: activating the K sets for activated channel measurement sets; activating the K sets for activated demodulation sets; or activating the K sets for activated interfering sets.

Optionally, in this embodiment, the processor performs, according to the program codes stored in the storage medium, the following step: deactivating the K sets includes at least one of: deactivating the K sets for deactivated channel measurement sets; deactivating the K sets for deactivated demodulation sets; or deactivating the K sets for deactivated interfering sets.

Optionally, in this embodiment, before the fifth type of signaling is sent to the second communication node, according to the program codes stored in the storage medium, the processor further performs at least one of: numbering sets; numbering elements in the sets; grouping the sets and numbering each group; grouping the elements in the sets and numbering each group; numbering the K activated sets; numbering at least one element in the K activated sets; grouping the K activated sets and numbering each group; or grouping elements in the K activated sets and numbering each group.

Optionally, in this embodiment, after the fifth type of signaling is sent to the second communication node, according to the program codes stored in the storage medium, the processor further sends a sixth type of signaling to the second communication node, where the sixth type of signaling carries a set of numbers indicating time-frequency code resource transmissions or an element in the set or an activated set or an element in the activated set; and receive a seventh type of signaling sent by the second communication node, where the seventh type of signaling carries the set of numbers indicating time-frequency code resource transmissions or the element in the set or the activated set or the element in the activated set.

Optionally, in this embodiment, the processor performs, according to the program codes stored in the storage medium, the following step: the numbers are transmitted through at least one of: a time-frequency code resource carrying index-associated information, an explicitly outputted index value, or joint encoding of the time-frequency code resource carrying the index-associated information and an explicitly outputted correlation value.

Optionally, in this embodiment, the processor performs, according to the program codes stored in the storage medium, the following step: a number of bits occupied by the sixth type of signaling is acquired according to a number of activated sets or a number of elements in the activated set.

Optionally, in this embodiment, the processor performs, according to the program codes stored in the storage medium, the following step: a number of bits occupied by the seventh type of signaling is acquired according to the number of activated sets or the number of elements in the activated set.

Optionally, in this embodiment, the processor performs, according to the program codes stored in the storage medium, the following step: the time-frequency code resource includes at least one of: one or more types of reference signal and a time-frequency code resource corresponding to the one or more types of reference signal; a time-frequency code resource in a control channel; or a time-frequency code resource in a data channel.

Optionally, in this embodiment, the processor performs, according to the program codes stored in the storage medium, the following step: the sixth type of signaling indicates first candidate sets or elements to enable the second communication node to detect a used set or element from the first candidate sets or elements.

Optionally, in this embodiment, the processor performs, according to the program codes stored in the storage medium, the following step: the seventh type of signaling indicates second candidate sets or elements for detecting the used set or element from the second candidate sets or elements.

Optionally, in this embodiment, the processor performs, according to the program codes stored in the storage medium, the following step: the sixth type of signaling or the seventh type of signaling is further used for at least one of: indicating a predetermined set for a channel measurement resource; indicating the predetermined set for a demodulation resource; indicating the predetermined set for an interference measurement resource; indicating an element in the predetermined set for the channel measurement resource; indicating the element in the predetermined set for the demodulation resource; or indicating the element in the predetermined set for the interference measurement resource.

Optionally, in this embodiment, before the N sets are configured according to the reference-signal-related information satisfying the predetermined channel characteristic requirement, according to the program codes stored in the storage medium, the processor further sends an eighth type of signaling to the second communication node, where the eighth type of signaling carries a configured set of channel characteristic requirements; or receive a ninth type of signaling sent by the second communication node, where the ninth type of signaling is used for indicating the configured set of channel characteristic requirements.

Optionally, in this embodiment, the processor performs, according to the program codes stored in the storage medium, the following step: the predetermined channel characteristic requirement is an element in the set of channel characteristic requirements.

Optionally, in this embodiment, before the N sets are configured according to the reference-signal-related information satisfying the predetermined channel characteristic requirement, according to the program codes stored in the storage medium, the processor sends a tenth type of signaling to the second communication node, where the tenth type of signaling carries a subset of an activated set of channel characteristic requirements; or receive an eleventh type of signaling sent by the second communication node, where the eleventh type of signaling is used for indicating the activated subset of the set of channel characteristic requirements.

Optionally, in this embodiment, the processor performs, according to the program codes stored in the storage medium, the following step: the predetermined channel characteristic requirement is an element in the subset of the set of channel characteristic requirements.

Optionally, in this embodiment, the processor performs, according to the program codes stored in the storage medium, the following step: the first type of signaling, the second type of signaling, the third type of signaling and the fourth type of signaling are configured as the first type of set, and the fifth type of signaling and the sixth type of signaling are configured as the second type of set, where the second type of set is a subset of the first type of set.

The seventh type of signaling and the eighth type of signaling are a set selected from the second type of set or elements in the set selected from the second type of set.

Optionally, in this embodiment, according to program codes stored in a storage medium, a processor receive a first type of signaling sent by the second communication node, where the first type of signaling carries N sets configured according to reference-signal-related information satisfying a predetermined channel characteristic requirement, where N is an integer greater than or equal to 1; and performs beam indication according to the N sets.

Optionally, in this embodiment, the processor performs, according to the program codes stored in the storage medium, the following step: the reference-signal-related information includes at least one of: a beam index, a same reference signal or different reference signals, a same reference signal index or different reference signal indexes, or a same reference signal antenna port or different reference signal antenna ports, where the reference signal index includes an explicit reference signal index or an implicit reference signal index.

Optionally, in this embodiment, the processor performs, according to the program codes stored in the storage medium, the following step: the predetermined channel characteristic requirement includes at least one of: elements within each of the N sets having a same channel characteristic or channel characteristics of the elements within each of the N sets satisfying a predetermined constraint.

Optionally, in this embodiment, the processor performs, according to the program codes stored in the storage medium, the following step: the channel characteristic includes one of: quasi-co-location (QCL), a quasi-co-located beam, a reference signal received power, a horizontal transmission azimuth, a vertical transmission azimuth, a horizontal reception azimuth, a vertical reception azimuth, average arrival time, cluster arrival time, a correlation coefficient of time domain channel responses, a correlation coefficient of frequency domain channel responses, or a spatial correlation coefficient.

Optionally, in this embodiment, the processor performs, according to the program codes stored in the storage medium, the following step: the beam includes at least one of a transmit beam or a receive beam.

Optionally, in this embodiment, the processor performs, according to the program codes stored in the storage medium, the following step: the N sets are further used for at least one of: indicating a transmission node, where the transmission node includes at least one of a serving transmission node or an interfering service node; or indicating a cell, where the cell includes at least one of a serving cell or an interfering cell.

Optionally, in this embodiment, the processor performs, according to the program codes stored in the storage medium, the following step: the N sets include at least one of a data set or an interfering set.

Optionally, in this embodiment, the processor performs, according to the program codes stored in the storage medium, the following step: after the first type of signaling sent by the second communication node is received, a method further includes receiving a second type of signaling sent by the second communication node, where the second type of signaling carries a set for reconfiguring the N sets.

Optionally, in this embodiment, after the first type of signaling sent by the second communication node is received, according to the program codes stored in the storage medium, the processor reconfigures the N sets; and sends a third type of signaling to the second communication node, where the third type of signaling carries the reconfigured N sets.

Optionally, in this embodiment, the processor performs, according to the program codes stored in the storage medium, the following step: reconfiguring the N sets includes at least one of: adding a set to the N sets; deleting an indicated set in the N sets; updating an element within the indicated set in the N sets; or deleting an element within the indicated set in the N sets.

Optionally, in this embodiment, after the third type of signaling is sent to the second communication node, according to the program codes stored in the storage medium, the processor further performs at least one of: sending a fourth type of signaling to the second communication node, where the fourth type of signaling carries information for associating Q sets with Y sets or information for associating the Q sets with elements in the Y sets or information for associating elements in the Q sets with elements in the Y sets; receiving a fifth type of signaling sent by the second communication node, where the fifth type of signaling carries the information for associating the Q sets with the Y sets or the information for associating the Q sets with the elements in the Y sets or the information for associating the elements in the Q sets with the elements in the Y sets; or associating the Q sets with the Y sets or associating the Q sets with the elements in the Y sets or associating the elements in the Q sets with the elements in the Y sets according to a predetermined rule; where Q and Y are integers greater than or equal to 1.

Optionally, in this embodiment, the processor performs, according to the program codes stored in the storage medium, the following step: the predetermined rule includes at least one of the following: indexes of multiple sets are within a constraint range or satisfy a specific function relationship; feedback or notification times of multiple sets are within a constraint range; or when a first type of set is configured, a second type of set is associated with a resource type of the first type of set in a default or predefined manner.

Optionally, in this embodiment, the processor performs, according to the program codes stored in the storage medium, the following step: elements in the associated sets satisfy the predetermined channel characteristic requirement.

Optionally, in this embodiment, the processor performs, according to the program codes stored in the storage medium, the following step: operations related to the associated sets include at least one of: activating part of the associated sets; deactivating part of the associated sets; indicating part of the associated sets; or indicating an element in part of the associated sets.

Optionally, in this embodiment, after the third type of signaling is sent to the second communication node, according to the program codes stored in the storage medium, the processor further activates or deactivates K sets; and sends a sixth type of signaling to the second communication node, where the sixth type of signaling carries the K sets, the K sets belong to at least one of: the N sets or the reconfigured N sets, where K is an integer greater than or equal to 1.

Optionally, in this embodiment, the processor performs, according to the program codes stored in the storage medium, the following step: activating the K sets includes at least one of: activating the K sets for activated channel measurement sets; activating the K sets for activated demodulation sets; or activating the K sets for activated interfering sets.

Optionally, in this embodiment, the processor performs, according to the program codes stored in the storage medium, the following step: deactivating the K sets includes at least one of: deactivating the K sets for deactivated channel measurement sets; deactivating the K sets for deactivated demodulation sets; or deactivating the K sets for deactivated interfering sets.

Optionally, in this embodiment, before the sixth type of signaling is sent to the second communication node, according to the program codes stored in the storage medium, the processor further performs at least one of: numbering sets and/or elements in the sets; grouping the sets and/or the elements in the sets and numbering each group; numbering activated sets and/or elements in the activated sets; or grouping the activated sets and/or the elements in the activated sets and numbering each group.

Optionally, in this embodiment, after the sixth type of signaling is sent to the second communication node, according to the program codes stored in the storage medium, the processor further sends a seventh type of signaling to the second communication node, where the seventh type of signaling carries a set of numbers indicating time-frequency code resource transmissions or an element in the set or an activated set or an element in the activated set; or receives an eighth type of signaling sent by the second communication node, where the eighth type of signaling carries the set of numbers indicating time-frequency code resource transmissions or the element in the set or the activated set or the element in the activated set.

Optionally, in this embodiment, the processor performs, according to the program codes stored in the storage medium, the following step: the numbers are transmitted through at least one of: a time-frequency code resource carrying index-associated information, an explicitly outputted index value, or joint encoding of the time-frequency code resource carrying the index-associated information and an explicitly outputted correlation value.

Optionally, in this embodiment, the processor performs, according to the program codes stored in the storage medium, the following step: a number of bits occupied by the seventh type of signaling is acquired according to a number of activated sets or a number of elements in the activated set.

Optionally, in this embodiment, the processor performs, according to the program codes stored in the storage medium, the following step: a number of bits occupied by the eighth type of signaling is acquired according to the number of activated sets or the number of elements in the activated set.

Optionally, in this embodiment, the processor performs, according to the program codes stored in the storage medium, the following step: the time-frequency code resource includes at least one of: one or more types of reference signal and a time-frequency code resource corresponding to the one or more types of reference signal; a time-frequency code resource in a control channel; or a time-frequency code resource in a data channel.

Optionally, in this embodiment, the processor performs, according to the program codes stored in the storage medium, the following step: the seventh type of signaling indicates first candidate sets or elements to enable the second communication node to detect a used set or element from the first candidate sets or elements.

Optionally, in this embodiment, the processor performs, according to the program codes stored in the storage medium, the following step: the eighth type of signaling indicates second candidate sets or elements for detecting the used set or element from the second candidate sets or elements.

Optionally, in this embodiment, the processor performs, according to the program codes stored in the storage medium, the following step: the seventh type of signaling or the eighth type of signaling is further used for at least one of: indicating a predetermined set for a channel measurement resource; indicating the predetermined set for a demodulation resource; indicating the predetermined set for an interference measurement resource; indicating an element in the predetermined set for the channel measurement resource; indicating the element in the predetermined set for the demodulation resource; or indicating the element in the predetermined set for the interference measurement resource.

Optionally, in this embodiment, before the first type of signaling sent by the second communication node is received, according to the program codes stored in the storage medium, the processor further sends a ninth type of signaling to the second communication node, where the ninth type of signaling carries a configured set of channel characteristic requirements; or receives a tenth type of signaling sent by the second communication node, where the tenth type of signaling is used for indicating the configured set of channel characteristic requirements.

Optionally, in this embodiment, the processor performs, according to the program codes stored in the storage medium, the following step: the predetermined channel characteristic requirement is an element in the set of channel characteristic requirements.

Optionally, in this embodiment, before the first type of signaling sent by the second communication node is received, according to the program codes stored in the storage medium, the processor further sends an eleventh type of signaling to the second communication node, where the eleventh type of signaling carries an activated subset of the set of channel characteristic requirements; or receives a twelfth type of signaling sent by the second communication node, where the twelfth type of signaling is used for indicating the activated subset of the set of channel characteristic requirements.

Optionally, in this embodiment, the processor performs, according to the program codes stored in the storage medium, the following step: the predetermined channel characteristic requirement is an element in the subset of the set of channel characteristic requirements.

Optionally, in this embodiment, the processor performs, according to the program codes stored in the storage medium, the following steps: the first type of signaling, the second type of signaling, the third type of signaling and the fourth type of signaling are configured as the first type of set, and the fifth type of signaling and the sixth type of signaling are configured as the second type of set, where the second type of set is a subset of the first type of set. The seventh type of signaling and the eighth type of signaling are a set selected from the second type of set or elements in the set selected from the second type of set. In an exemplary embodiment, for specific examples in this embodiment, reference may be made to the examples described in the above-mentioned embodiments and optional embodiments, and repetition will not be made in this embodiment.

The modules or steps in the embodiments described above may be implemented by a universal computing device. The modules or steps may be concentrated on a single computing device or distributed on a network composed of multiple computing devices. Alternatively, the modules or steps may be implemented by program codes executable by the computing device so that the modules or steps may be stored in a storage device and executed by the computing device. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

INDUSTRIAL APPLICABILITY

The signaling sending method and device and the signaling receiving method and device provided by the present disclosure can solve the problem in the related art that beam indications and beam management are complex.

What is claimed is:

1. A signaling sending method, comprising:
configuring a number of sets to include reference signal related information,
wherein each of the number of sets includes one or more reference signal indexes that satisfy a respective quasi co-location (QCL) relationship associated with one set of the number of sets;
generating a first type of signaling that includes the number of sets;
sending, to a communication node, the first type of signaling;
sending a second type of signaling to the communication node, wherein the second type of signaling includes an indication of a second number of sets to be activated or deactivated by the communication node, wherein the second number of sets belong to the number of sets;
reconfiguring, after sending the first type of signaling to the communication node, the number of sets, wherein reconfiguring the number of sets comprises at least one of: adding a set to the number of sets, or deleting a specified set in the number of sets; and
sending a third type of signaling to the communication node, wherein the third type of signaling includes the reconfigured number of sets.

2. The method of claim 1, wherein the second number of sets belong to the reconfigured number of sets.

3. The method of claim 1, wherein the second number of sets include channel measurement sets or interfering sets.

4. A signaling receiving method, comprising
receiving a first type of signaling sent by a communication node, wherein the first type of signaling includes a number of sets configured to include reference signal related information,
wherein each of the number of sets includes one or more reference signal indexes that satisfy a respective quasi co-location (QCL) relationship associated with one set of the number of sets;

receiving a second type of signaling that includes an indication of a second number of sets, wherein the second number of sets belong to the number of sets;
receiving, after receiving the first type of signaling sent by the communication node, a third type of signaling sent by the communication node,
wherein the third type of signaling includes a reconfigured number of sets,
wherein the reconfigured number of sets are based on a reconfiguration of the number of sets; and
activating or deactivating the second number of sets based on the second type of signaling.

5. The method of claim 4, wherein the second number of sets belong to the reconfigured number of sets.

6. The method of claim 4, wherein activating the second number of sets comprises at least one of:
activating the second number of sets for activated channel measurement sets; or
activating the second number of sets for activated interfering sets.

7. The method of claim 4, wherein deactivating the second number of sets comprises at least one of:
deactivating the second number of sets for deactivated channel measurement sets; or
deactivating the second number of sets for deactivated interfering sets.

8. A signaling sending device, comprising:
a processor configured to:
configure a number of sets to include reference signal related information,
wherein each of the number of sets includes one or more reference signal indexes that satisfy a respective quasi co-location (QCL) relationship associated with one set of the number of sets;
generate a first type of signaling that includes the number of sets;
send, to a communication node, the first type of signaling;
send a second type of signaling to the communication node, wherein the second type of signaling includes an indication of a second number of sets to be activated or deactivated by the communication node, wherein the second number of sets belong to the number of sets;
reconfigure, after the first type of signaling is sent to the communication node, the number of sets, wherein the processor is configured to reconfigure the number of sets by being configured to perform at least one of: add a set to the number of sets, or delete a specified set in the number of sets; and
send a third type of signaling to the communication node, wherein the third type of signaling includes the reconfigured number of sets.

9. The signaling receiving device of claim 8, wherein the second number of sets belong to the reconfigured number of sets.

10. The signaling sending device of claim 8, wherein the second number of sets include channel measurement sets or interfering sets.

11. A signaling receiving device, comprising:
a processor configured to:
receive a first type of signaling sent by a communication node, wherein the first type of signaling includes a number of sets configured to include reference signal related information,
wherein each of the number of sets includes one or more reference signal indexes that satisfy a respective quasi co-location (QCL) relationship associated with one set of the number of sets;

receive a second type of signaling that includes an indication of a second number of sets, wherein the second number of sets belong to the number of sets;

receive, after the first type of signaling sent by the communication node is received, a third type of signaling sent by the communication node,
  wherein the third type of signaling includes a reconfigured number of sets,
  wherein the reconfigured number of sets are based on a reconfiguration of the number of sets; and activate or deactivate the second number of sets based on the second type of signaling.

12. The signaling receiving device of claim 11, wherein the second number of sets belong to the reconfigured number of sets.

13. The signaling receiving device of claim 11, wherein the processor is configured to activate the second number of sets by being configured to perform at least one of:
  activate the second number of sets for activated channel measurement sets; or
  activate the second number of sets for activated interfering sets.

14. The signaling receiving device of claim 11, wherein the processor is configured to deactivate the second number of sets by being configured to perform at least one of:
  deactivate the second number of sets for deactivated channel measurement sets; or
  deactivate the second number of sets for deactivated interfering sets.

* * * * *

UNITED STATES PATENT AND TRADEMARK OFFICE
CERTIFICATE OF CORRECTION

PATENT NO. : 11,277,244 B2
APPLICATION NO. : 16/505704
DATED : March 15, 2022
INVENTOR(S) : Gao et al.

It is certified that error appears in the above-identified patent and that said Letters Patent is hereby corrected as shown below:

In the Drawings

In Fig. 3, Sheet 2 of 18, for Step "S302", in Line 1, delete "siGnaling" and insert -- signaling --, therefor.

In Fig. 3, Sheet 2 of 18, for Step "S302", in Line 3, delete "-rclated" and insert -- -related --, therefor.

In the Specification

In Column 1, Line 66, delete "CSI-RS)" and insert -- (CSI-RS) --, therefor.

In Column 14, Line 18, delete "perform" and insert -- performed --, therefor.

In Column 19, Line 51, delete "have" and insert -- that have --, therefor.

In Column 25, Line 62, delete "requirement a channel characteristic requirement" and insert -- requirement is --, therefor.

In Column 26, Line 5, delete "form." and insert -- thereof. --, therefor.

In Column 28, Line 14, delete "includes" and insert -- includes: --, therefor.

In Column 28, Line 57, delete "includes" and insert -- includes: --, therefor.

In the Claims

In Column 43, Line 59, in Claim 4, delete "comprising" and insert -- comprising: --, therefor.

In Column 44, Line 52, in Claim 9, delete "receiving" and insert -- sending --, therefor.

Signed and Sealed this
Ninth Day of August, 2022

Katherine Kelly Vidal
*Director of the United States Patent and Trademark Office*